(12) United States Patent
Chen et al.

(10) Patent No.: US 11,758,151 B2
(45) Date of Patent: Sep. 12, 2023

(54) TEMPLATE MATCHING IN VIDEO CODING

(71) Applicant: QUALCOMM Incorporated, San Diego, CA (US)

(72) Inventors: Chun-Chi Chen, San Diego, CA (US); Han Huang, San Diego, CA (US); Zhi Zhang, Munich (DE); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 39 days.

(21) Appl. No.: 17/558,119

(22) Filed: Dec. 21, 2021

(65) Prior Publication Data

US 2022/0210438 A1 Jun. 30, 2022

Related U.S. Application Data

(60) Provisional application No. 63/131,676, filed on Dec. 29, 2020.

(51) Int. Cl.
*H04N 19/159* (2014.01)
*H04N 19/139* (2014.01)
(Continued)

(52) U.S. Cl.
CPC ......... *H04N 19/159* (2014.11); *H04N 19/132* (2014.11); *H04N 19/139* (2014.11);
(Continued)

(58) Field of Classification Search
CPC .. H04N 19/159; H04N 19/132; H04N 19/139; H04N 19/172; H04N 19/176; H04N 19/513; H04N 19/70
See application file for complete search history.

(56) References Cited

U.S. PATENT DOCUMENTS

2018/0098089 A1* 4/2018 Chen .................... H04N 19/102
2018/0131960 A1* 5/2018 Wang ................... H04N 19/139
(Continued)

FOREIGN PATENT DOCUMENTS

CN 111050182 B * 2/2022 ........... H04N 19/105
WO 2019188942 A1 10/2019

OTHER PUBLICATIONS

Chen H., et al., "Description of SDR, HDR and 360° Video Coding Technology Proposal by Huawei, GoPro, HiSilicon, and Samsung—General Application Scenario", 122. MPEG Meeting, Apr. 16, 2018-Apr. 20, 2018, San Diego, (Motion Picture Expert Group or ISO/IEC JTC1/SC29/WG11), No. m42355, Apr. 14, 2018 (Apr. 14, 2018), XP030261679, 135 Pages, Retrieved from the Internet: URL: http://phenix.int-evry.fr/mpeg/doc_end_user/documents/122_San%20Diego/wg11/m42355-JVET-J0025-v4-JVET-J0025-v4.zip. JVET-J0025_v3.docx [Retrieved on Apr. 14, 2018].
(Continued)

*Primary Examiner* — Fabio S Lima
(74) *Attorney, Agent, or Firm* — Shumaker & Sieffert, P.A.

(57) ABSTRACT

A video decoder may be configured to determine a motion vector and a motion vector precision for a current block; identify a current block template within the current picture; search within a search area for a final reference block template that corresponds to the current block template, wherein to search within the search area, the one or more processors are further configured to: identify an initial reference block template based on the motion vector, search other reference block templates around the initial reference block template using a step size that is set to an initial step size, and iteratively reduce the step size from the initial step size until the step size is set to a final step size that equals
(Continued)

the motion vector precision; determine a prediction block for the current block based on the final reference block template.

45 Claims, 15 Drawing Sheets

(51) Int. Cl.
    H04N 19/176    (2014.01)
    H04N 19/172    (2014.01)
    H04N 19/132    (2014.01)
    H04N 19/513    (2014.01)
    H04N 19/70     (2014.01)
(52) U.S. Cl.
    CPC ......... H04N 19/172 (2014.11); H04N 19/176 (2014.11); H04N 19/513 (2014.11); H04N 19/70 (2014.11)

(56) References Cited

U.S. PATENT DOCUMENTS

| | | | |
|---|---|---|---|
| 2018/0249154 | A1 | 8/2018 | Chuang et al. |
| 2019/0007699 | A1 | 1/2019 | Liu et al. |
| 2020/0195956 | A1 | 6/2020 | Robert et al. |
| 2020/0359045 | A1 | 11/2020 | Liu et al. |
| 2020/0382807 | A1* | 12/2020 | Liu ......................... H04N 19/44 |
| 2021/0203947 | A1* | 7/2021 | He .......................... H04N 19/13 |

OTHER PUBLICATIONS

Esenlik (Huawei) S., et al., "Description of Core Experiment 9 (CE9): Decoder SideMotion Vector Derivation", 122. MPEG Meeting, Apr. 16, 2018-Apr. 20, 2018, San Diego, (Motion Picture Expert Group or ISO/IEC JTC1/SC29/WG11), No. M4283, May 29, 2018 (May 9, 2018), XP030262097, 33 Pages, Retrieved from the Internet: URL: http://phenix.int-evry.fr/mpeg/doc_end_user/documents/122_San%20Diego/wg11/m42832-JVET-J1029-v3-JVET-J1029_r2.zip. JVET-J1029_r2.doc [Retrieved on May 9, 2018].
International Search Report and Written Opinion—PCT/US2021/064908—ISA/EPO—dated Apr. 14, 2022.
Abdoli M., et al., "Non-CE3: Decoder-Side Intra Mode Derivation with Prediction Fusion Using Planar," JVET-O0449-v2, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-9.
Bross B., et al., "Versatile Video Coding Editorial Refinements on Draft 10," JVET-T2001-v1, Joint Video Experts Team (JVET) of ITU-T SG 16 WP 3 and ISO/IEC JTC 1/SC 29, 20th Meeting, by Teleconference, Oct. 7-16, 2020, pp. 1-514.
Chang Y-J., et al., "Compression Efficiency Methods Beyond VVC," Joint Video Experts Team (JVET) of ITU-T SG 16 WP 3 and ISO/IEC JTC 1/SC 29, JVET-U0100, 133. MPEG Meeting, 21st Meeting, by teleconference, Jan. 6-15, Jan. 11, 2021-Jan. 15, 2021, Online, (Motion Picture Expert Group or ISO/IEC JTC1/SC29/WG11), No. m55890 Dec. 31, 2020 (Dec. 31, 2020), XP030290689, pp. 1-13, Retrieved from the Internet: URL:https://dms.mpeg.expert/doc_end_user/documents/133_Teleconference/wg11/m55890-JVET retrieved on Dec. 31, 2020].
Chang Y-J., et al., "EE2: Tests of Compression Efficiency Methods Beyond VVC," JVET-V0120-v2, Joint Video Experts Team (JVET) of ITU-T SG 16 WP 3 and ISO/IEC JTC 1/SC 29, 22nd Meeting, by teleconference, Apr. 20-28, 2021, pp. 1-31.
Chen J., et al., "Algorithm Description for Versatile Video Coding and Test Model 11 (VTM 11)," JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-102.
Chen Y., et al., "Description of SDR, HDR and 360° Video Coding Technology Proposal by Qualcomm and Technicolor—Low and High Complexity Versions," JVET-J0021, Joint Video Exploration Team (JVET) of ITU-T SG 16 WP 3 and ISO/IEC JTC 1/SC 29/WG 11, 10th Meeting: San Diego, US, Apr. 10-20, 2018, pp. 1-42.
Han Y., et al., "CE4.4.6: Improvement on Merge/Skip Mode," JVET-L0399_r2, Joint Video Exploration Team (JVET) of ITU-T SG 16 WP 3 and ISO/IEC JTC 1/SC 29/WG 11, JVET-L0399, 12th Meeting: Macao, CN, Oct. 3-12, 2018, pp. 1-6.
Henry F., et al., "Residual Coefficient Sign Prediction," 4th JVET Meeting, Oct. 15, 2016-Oct. 21, 2016; Chengdu; (The Joint Video Exploration Team of ISO/IEC JTC1/SC29/WG11 and ITU-T SG.16 WG 3), URL: http://phenix.int-evry.fr/vet/, No. JVET-D0031, Oct. 20, 2016 (Oct. 20, 2016), JVET-D0031-v4, XP030150258, pp. 1-6.
ITU-T H.265: "Series H: Audiovisual and Multimedia Systems Infrastructure of Audiovisual Services—Coding of Moving Video," High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video," Versatile Video Coding, The International Telecommunication Union, Aug. 2020, 516 pages.
Li G. et al., "CE2-2.2: Affine Merge with Prediction Offset," JVET-N0378, Joint Video Experts Team (JVET) of ITU-T SG 16 WP 3 and ISO/IEC JTC 1/SC 29/WG 11, 14th Meeting: Geneva, CH, Mar. 17-29, 2019, pp. 1-5.
Lin Z-Y., et al., "CE10.2.1: OBMC," JVET-L0101-v1, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-7.
Ray B., et al., "Unified PDPC for Angular Intra Modes," JVET-Q391-v3, Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-7.
Schwarz H., et al., "Additional Support of Dependent Quantization with 8 States," JVET-Q0243-v2, Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-12.
Seregin V., et al.,"CE4-3.1a and CE4-3.1b: Unidirectional Local Illumination Compensation with Affine Prediction," Joint Video Experts Team (JVET) of ITU-T SG 16 WP 3 and ISO/IEC JTC 1/SC 29/WG 11, JVET-O0066-v1, 15th Meeting: Gothenburg, SE, Jul. 3-12, 2019, pp. 1-5.
Seregin V., et al., "Block Shape Dependent Intra Mode Coding," 4 JVET Meeting, Chengdu, (The Joint Mdeo Exploration Team of ISO/IEC JTC1/SC29/WG11 and ITU-T SG.16 WP 3), JVET-D0114r1, URL: http://phenix.int-evry.fr/jvet/, CN, Oct. 15-21, 2016, 3 pages.
Seregin V., et al., "Exploration Experiment on Enhanced Compression Beyond VVC Capability," JVET-U2024-v2, Joint Video Experts Team (JVET) of ITU-T SG 16 WP 3 and ISO/IEC JTC 1/SC 29, 21st Meeting, by teleconference, Jan. 6-15, 2021, pp. 1-19.
Sullivan G.J., et al., "Overview of the High Efficiency Video Coding (HEVC) Standard," IEEE Transactions on Circuits and Systems for Video Technology, vol. 22, No. 12, Dec. 2012, pp. 1649-1668.
Wang Y-K., et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.
Winken M., et al., "CE10: Multi-Hypothesis Inter Prediction (Test 10.1.2)," JVET-M0425-v2, Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-14.
Zhang K., et al., "Enhanced Cross-Component Linear Model Intra-Prediction," JVET-D0110, Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-D0110-v3, pp. 1-6.
Zhao L., et al., "Non-CE: Weighted Intra and Inter Prediction Mode," Joint Video Experts Team (JVET) of ITU-T SG 16 WP 3 and ISO/IEC JTC 1/SC 29/WG 11, JVET-O0537, 15th Meeting: Gothenburg, SE, Jul. 3-12, 2019, Doc: JVET-O0537, pp. 1-6.
Zhao X., et al., "Six Tap Intra Interpolation Filter," JVET Meeting, 4th Meeting, Chengdu, (The Joint Video Exploration Team (JVET)

(56) References Cited

OTHER PUBLICATIONS of ITU-T SG 16 WP 3 and ISO/IEC JTC 1/SC 29/WG 11), CN Oct. 15-21, 2016, No. JVET-D0119r1, pp. 1-3.

* cited by examiner

TEMPLATE MATCHING IN VIDEO CODING

This application claims the benefit of U.S. Provisional Patent Application 63/131,676, filed 29 Dec. 2020, the entire content of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

A video decoder may be configured to perform template matching. When decoding video data according to a template matching mode, some or all of the motion information for a block is not signaled but instead derived by the video decoder. Template matching may be performed for either or both of selecting a motion vector candidate from a candidate list or for motion vector refinement. Template matching may be applied in both advanced motion vector predictor (AMVP) mode and regular merge mode. In AMVP mode, a motion vector predictor (MVP) candidate may be selected from a list of candidates using template matching to identify the candidate in the list that has the minimal difference between a current block template and a reference block template. In regular merge mode, a template matching mode flag may be signaled to indicate the use of template matching, and template matching may then be used for motion vector refinement of a motion vector selected from a merge candidate list.

When performing template matching, a video decoder finds the closest match between a reference template (top and/or left neighboring blocks of the current CU) in the current picture and a corresponding template region, which is the same size as the reference template, in a search area of a reference picture. The search area in the reference picture may, for example, be identified relative to the current CU.

As introduced above, a video decoder may be configured to perform motion vector refinement. Some motion vector refinement processes utilize a pattern-based motion vector search process that may include a hierarchical structure. Using a specified search pattern, the video decoder determines a template matching cost for the reference template and a plurality of corresponding template regions in the current picture. The hierarchical structure specifies an iterative process to refine the motion, starting at a coarse precision (e.g., quarter-pel) and ending at a fine precision (e.g., ⅛-pel). In one example, a video decoder may be configured to first search the motion vector at quarter luma sample precision with a diamond pattern, followed by quarter luma sample precision with a cross pattern, and then followed by one-eighth luma sample precision with a cross pattern.

Beginning a motion vector refinement process with a quarter-pel step size, regardless of the motion vector precision of the motion vector being refined, may introduce both undesired complexity and a rounding error in some coding scenarios. This can result in lower performance in terms of coding gain for those coding scenarios. To address this potential problem, this disclosure describes techniques for aligning the finest motion vector precision used in template matching with the motion vector precision of the motion vector being refined. By iteratively reducing the step size from an initial step size until the step size is set to a final step size that equals the motion vector precision, the techniques of this disclosure may produce the advantages of reducing the complexity and rounding errors introduced by the motion vector refinement process.

According to one example, a device for decoding video data includes one or more processors implemented in circuitry and configured to: determine that a current block of a current picture is encoded in an inter prediction mode; determine a motion vector for the current block based on the inter prediction mode; determine a motion vector precision for the motion vector; identify a current block template within the current picture; search within a search area for a final reference block template that corresponds to the current block template, wherein to search within the search area, the one or more processors are further configured to: identify an initial reference block template based on the motion vector, search other reference block templates around the initial reference block template using a step size that is set to an initial step size, and iteratively reduce the step size from the initial step size until the step size is set to a final step size that equals the motion vector precision; determine a prediction block for the current block based on the final reference block template; decode the current picture based on the determined prediction block; and output a decoded version of the current picture.

According to another example, a method of decoding video data includes determining that a current block of a current picture is encoded in an inter prediction mode; determining a motion vector for the current block based on the inter prediction mode; determining a motion vector precision for the motion vector; identifying a current block template within the current picture; searching within a search area for a final reference block template that corresponds to the current block template, wherein searching within the search area comprises: identifying an initial reference block template based on the motion vector, searching other reference block templates around the initial reference block template using a step size that is set to an initial step size, and iteratively reducing the step size from the initial step size until the step size is set to a final step size that equals the motion vector precision; determining a prediction block for the current block based on the final reference block template; decoding the current picture based on the determined prediction block; and outputting a decoded version of the current picture.

According to another example, a computer-readable storage medium stores instructions that when executed by one or more processors cause the one or more processors to: determine that a current block of a current picture is encoded in an inter prediction mode; determine a motion vector for the current block based on the inter prediction mode; determine a motion vector precision for the motion vector; identify a current block template within the current picture; search within a search area for a final reference block template that corresponds to the current block template, wherein to search within the search area, the instructions cause the one or more processors to: identify an initial reference block template based on the motion vector, search other reference block templates around the initial reference block template using a step size that is set to an initial step size, and iteratively reduce the step size from the initial step size until the step size is set to a final step size that equals the motion vector precision; determine a prediction block for the current block based on the final reference block template; decode the current picture based on the determined prediction block; and output a decoded version of the current picture.

According to another example, a device for decoding video data includes means for determining that a current block of a current picture is encoded in an inter prediction mode; means for determining a motion vector for the current block based on the inter prediction mode; means for determining a motion vector precision for the motion vector; means for identifying a current block template within the current picture; means for searching within a search area for a final reference block template that corresponds to the current block template, wherein the means for searching within the search area comprises: means for identifying an initial reference block template based on the motion vector, means for searching other reference block templates around the initial reference block template using a step size that is set to an initial step size, and means for iteratively reducing the step size from the initial step size until the step size is set to a final step size that equals the motion vector precision; means for determining a prediction block for the current block based on the final reference block template; means for decoding the current picture based on the determined prediction block; and means for outputting a decoded version of the current picture.

The details of one or more examples are set forth in the accompanying drawings and the description below. Other features, objects, and advantages will be apparent from the description, drawings, and claims.

DETAILED DESCRIPTION

Figure 1:
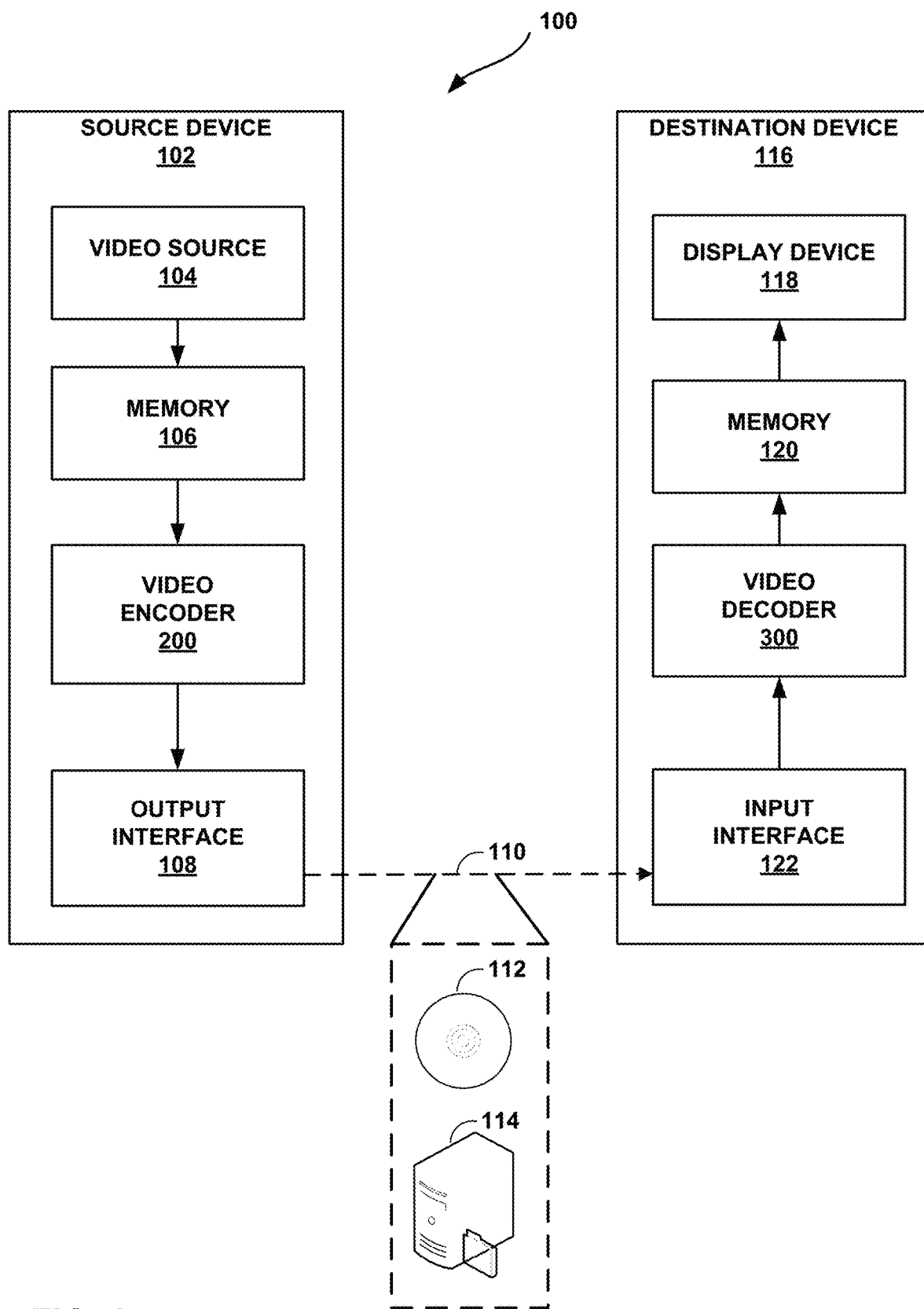
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF).

Parameters for these filtering operations may either be determined by a video encoder and explicitly signaled in the encoded video bitstream or may be implicitly determined by a video decoder without needing the parameters to be explicitly signaled in the encoded video bitstream.

A video decoder may be configured to perform template matching. With this mode, some or all of the motion information for a block is not signaled but instead derived by the video decoder. Template matching may be performed for either or both of selecting a motion vector candidate from a candidate list or for motion vector refinement. Template matching may be applied in both advanced motion vector predictor (AMVP) mode and regular merge mode. In AMVP mode, a motion vector predictor (MVP) candidate may be selected from a list of candidates using template matching to identify the candidate in the list that has the minimal difference between a current block template and a reference block template. In regular merge mode, a template matching mode flag may be signaled to indicate the use of template matching, and template matching may then be used for motion vector refinement of a motion vector selected from a merge candidate list.

When performing template matching, a video decoder finds the closest match between a reference template (top and/or left neighboring blocks of the current CU) in the current picture and a corresponding template region, which is the same size as the reference template, in a search area of a reference picture. The search area in the reference picture may, for example, be identified relative to the current CU.

As introduced above, a video decoder may be configured to perform motion vector refinement. Motion vector refinement is a pattern-based motion vector search process with a hierarchical structure. Using a specified search pattern, the video decoder determines a template matching cost for the reference template and a plurality of corresponding template regions in the current picture. The hierarchical structure specifies an iterative process to refine the motion, starting at a coarse precision (e.g., quarter-pel) and ending at a fine precision (e.g., ⅛-pel). In one example, a video decoder may be configured to first search the motion vector at quarter luma sample precision with a diamond pattern, followed by quarter luma sample precision with a cross pattern, and then followed by one-eighth luma sample precision with a cross pattern. The search range for the motion vector refinement may, for example, be set equal to (−8, +8) luma samples around the initial motion vector.

Beginning a motion vector refinement process with a quarter-pel step size, regardless of the motion vector precision of the motion vector being refined, however, may introduce both undesired complexity and a rounding error in some coding scenarios, which can result in lower performance in terms of coding gain for those coding scenarios. To address this potential problem, this disclosure describes techniques for aligning the finest motion vector precision used in template matching with the motion vector precision of the motion vector being refined. That is, for a determined motion vector precision, (i.e., 4-pel, 1-pel, half-pel, quarter-pel, ⅛-pel, ¹⁄₁₆-pel and so on for all power-of-2 precisions), a video decoder may be configured such that the refinement process of template matching stops at the same motion vector precision as the precision of the motion vector being defined, and does not go beyond that precision. Accordingly, the template matching-refined motion vector has a motion vector precision equal to or greater than the motion vector precision of the initial motion vector.

The initial step size of a template matching motion vector refinement process with a hierarchical search pattern may be determined based on the motion vector precision of the initial motion vector. The initial step size can be the same precision as that of the initial motion vector or something greater. In general, when the initial motion vector has an N-pel motion vector precision (e.g., N is a power-of-2 number, including 4, 1, ½, ¼, ⅛, ¹⁄₁₆), the initial step size may be M-pel which is set equal to N, 2N, 4N or something larger with a power-of-2 scale. By iteratively reducing the step size from an initial step size until the step size is set to a final step size that equals the motion vector precision, the techniques of this disclosure may produce the advantages of reducing the complexity and the rounding errors described above.

This disclosure generally describes techniques related to decoder-side motion vector derivation techniques, such as template matching, bilateral matching, and decoder-side MV refinement. Although these techniques are referred to as being performed at the decoder-side, it should be understood that the decoder-side motion vector derivation techniques described herein may also be performed by a video encoder, as part of determining how to encode a block of video data. The techniques of this disclosure may be applied to any of the existing video codecs, such as High Efficiency Video Coding (HEVC), Versatile Video Coding (VVC), Essential Video Coding (EVC), or be an efficient coding tool in future video coding standards.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the decoder-side motion vector derivation techniques described herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform the decoder-side motion vector derivation techniques described herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the range extension, multiview extension (MV-HEVC), or scalable extension (SHVC). Additionally or alternatively, video encoder 200 and video decoder 300 may operate according to other proprietary or industry standards, such as ITU-T H.266, also referred to as Versatile Video Coding (VVC).

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is encoded using three separate color planes and syntax structures used to code the samples. A CTB may be an N×N block of samples for some value of N such that the division of a component into CTB s is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU has 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using AMVP or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
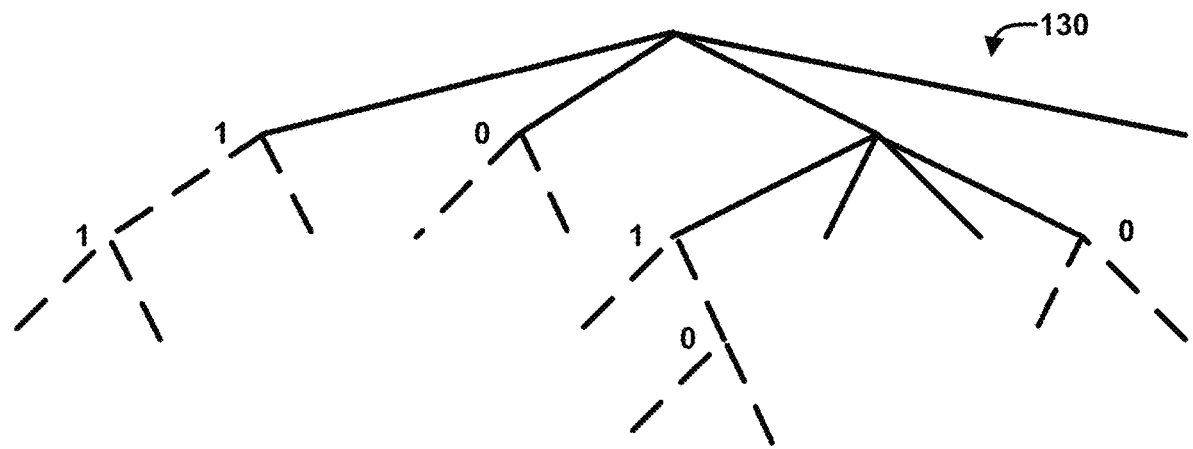
FIGS. 2A and 2B are conceptual diagrams illustrating an example quadtree binary tree (QTBT) structure, and a corresponding coding tree unit (CTU).
Figure 2B:
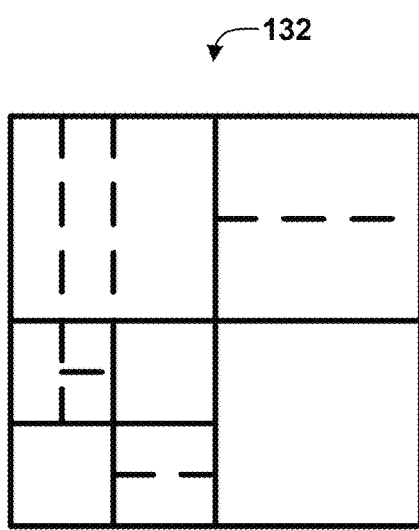

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (e.g., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a CU, which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node may not be further split by the binary tree, because the size exceeds the MaxBTSize (i.e., 64×64, in this example). Otherwise, the quadtree leaf node can be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

In HEVC, the largest coding unit in a slice is a CTB, also called a CTU. A CTB contains a quad-tree, the nodes of which are CUs. The size of a CTB can typically range from 16×16 to 64×64 in the HEVC main profile, although in some scenarios 8×8 CTB sizes may also be supported. A CU may range in size from being the same size as a CTB to as small as 8×8. Each CU is encoded with one coding mode, e.g., inter or intra. When a CU is inter coded, the CU may be further partitioned into 2 or 4 PUs or become just one PU if further partitioning is not applied. When two PUs are present in one CU, the two PUs can be half size rectangles or two rectangles with sizes of ¼ or ¾ the size of the CU.

When a CU is inter coded, each PU has one set of motion information, which is derived with a unique inter prediction mode. In the HEVC standard, there are two inter prediction modes, referred to as merge mode (with skip mode being considered a special case of merge mode) and AMVP mode, respectively, for a PU.

In either AMVP or merge mode, video encoder 200 and video decoder 300 may be configured to maintain a motion vector (MV) candidate list, with the list including multiple motion vector predictors. Video encoder 200 and video decoder 300 may be configured to generate the motion vector(s), as well as reference indices in the merge mode, for the current PU by selecting a candidate from the MV candidate list.

In HEVC, the MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, video encoder 200 and video decoder 300 may be configured to determine the reference pictures used for the prediction of the current blocks, as well as the associated motion vectors, based on the selected candidate. For AMVP mode, in contrast, for each potential prediction direction from either list 0 or list 1, a reference index is explicitly signaled, together with an MV predictor (MVP) index to the MV candidate list. In AMVP mode, the predicted motion vectors can be further refined by, for example, receiving a motion vector differences that can be added to the MVP. The candidates for the candidate lists in both modes may be derived similarly from the same spatial and temporal neighboring blocks.

Figure 3B:
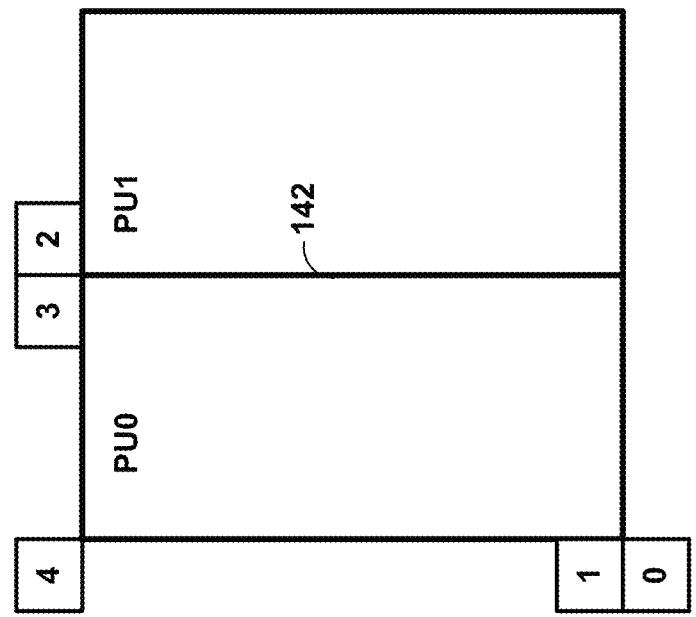
FIG. 3B is a conceptual diagram illustrating spatial motion vector candidates for an advanced motion vector prediction (AMVP) mode.
Figure 3A:
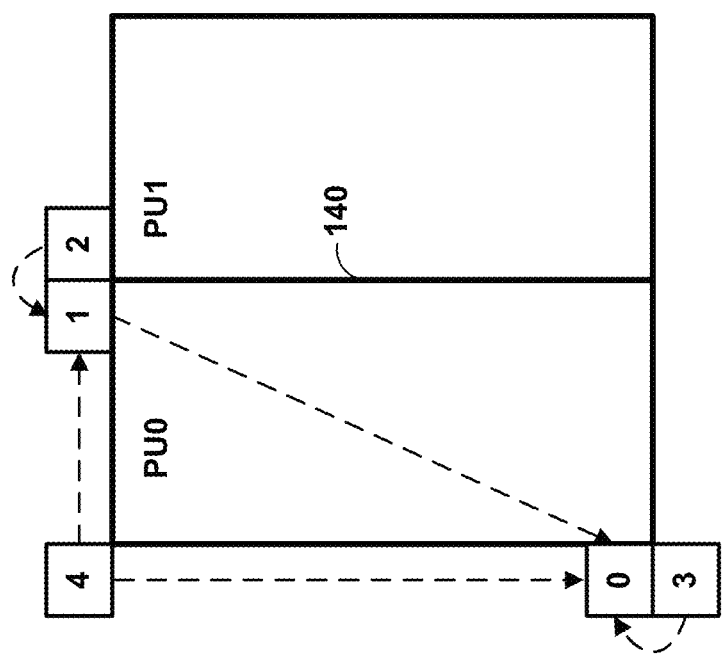
FIG. 3A is a conceptual diagram illustrating spatial motion vector candidates for a merge mode.

FIG. 3A is a conceptual diagram showing an example of spatial neighboring motion vector candidates for merge mode. Video decoder 300 may generate a candidate list by adding the motion information of spatial neighboring candidates to the candidate list. Spatial MV candidates are derived from the neighboring blocks shown in FIGS. 3A and 3B, for a specific PU (PU0), although the processes for generating the candidates from the blocks may differ for merge and AMVP modes. In merge mode, up to five spatial MV candidates can be derived for block 140 (PU0) with the orders shown in FIG. 3A. The order is the following: left (0), above (1), above right (2), below left (3), and above left (4), as shown in FIG. 3A.

FIG. 3B is a conceptual diagram showing an example of spatial neighboring motion vector candidates for AMVP. In AMVP mode, the neighboring blocks of block 142 (PU0) are divided into two groups: a left group including block 0 and 1, and an above group including blocks 2, 3, and 4, as shown in FIG. 3B. For each group, the potential candidate in a neighboring block referring to the same reference picture as that indicated by the signaled reference is prioritized to form a final candidate of the group. It is possible that all neighboring blocks do not contain a motion vector pointing to the same reference picture. Therefore, if such a candidate cannot be found, the first available candidate may be scaled to form the final candidate, allowing the temporal distance differences to be compensated.

Temporal motion vector prediction in HEVC will now be discussed. Video encoder 200 and video decoder 300 may be configured to add a temporal motion vector predictor (TMVP) candidate, if enabled and available, into the MV candidate list after spatial motion vector candidates are added. The process of motion vector derivation for a TMVP candidate may be the same for both merge and AMVP modes. However, in HEVC, the target reference index for the TMVP candidate in the merge mode may be set to 0.

Figure 4B:
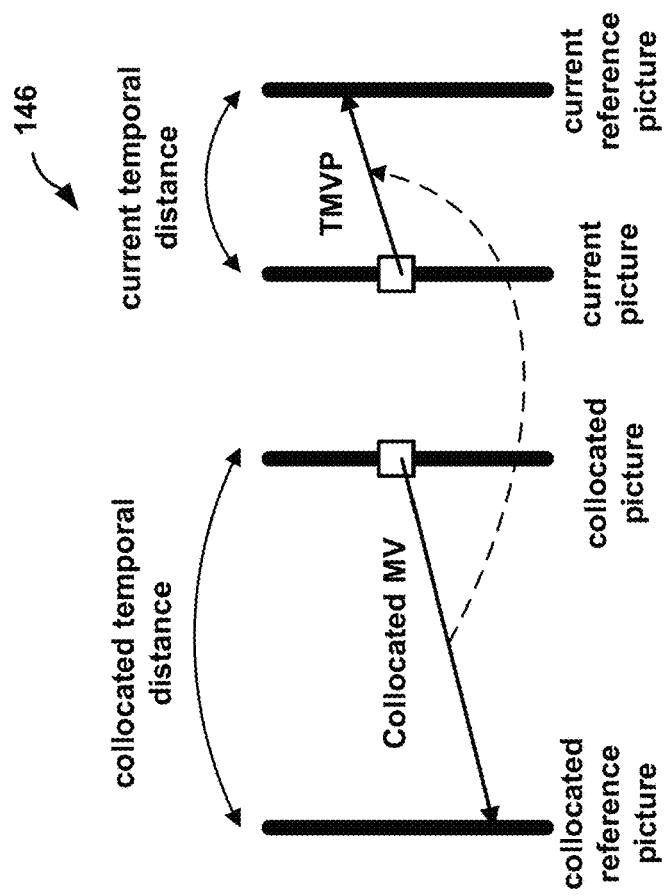
FIG. 4B is a conceptual diagram illustrating motion vector scaling.
Figure 4A:
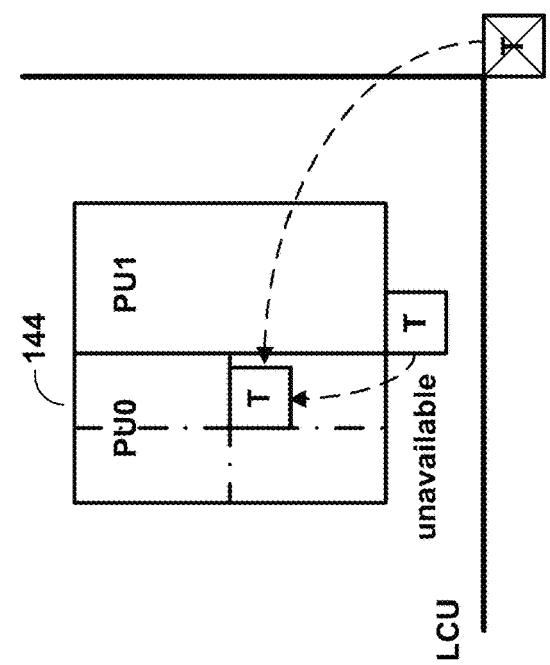
FIG. 4A is a conceptual diagram illustrating temporal motion vector candidates.

FIG. 4A is a conceptual diagram showing an example of a TMVP candidate for block 144 (PU0). The primary block location for TMVP candidate derivation is the bottom right block outside of the collocated PU, which is shown as block "T" in FIG. 4A, to compensate the bias to the above and left blocks used to generate spatial neighboring candidates. However, if that block is located outside of the current CTB row or motion information is not available, the block is substituted with a center block of the PU.

Video decoder 300 may derive a motion vector for the TMVP candidate from the co-located PU of the co-located picture, indicated at a slice level. The motion vector for the co-located PU is called the collocated MV. A block in a reference picture may, for example, be considered to be co-located to a block in a current picture if the block in the reference picture and the current block each include at least one pixel corresponding to a same relative position in the reference picture and the current picture.

FIG. 4B is a conceptual timing diagram showing an example of motion vector scaling process 146. Similar to temporal direct mode in AVC, to derive the TMVP candidate motion vector, video decoder 300 may scale the co-located MV to compensate for the temporal distance differences, as shown in FIG. 4B. With motion vector scaling, it is generally assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector being predicted, the associated containing picture and reference picture may be different. Therefore, a new distance based on POC may be calculated, and the motion vector may be scaled based on the two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Video encoder 200 and video decoder 300 may be configured to perform artificial motion vector candidate generation. If a motion vector candidate list is not complete (e.g., less than some predetermined number of candidates), artificial motion vector candidates are generated and inserted at the end of the list until the list has the designated number of candidates.

In merge mode, there are two types of artificial MV candidates: combined candidate derived only for B-slices and zero motion vector candidates used for AMVP if the first type doesn't provide enough artificial candidates.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Video encoder 200 and video decoder 300 may be configured to perform a pruning process for candidate insertion. Candidates from different blocks may happen to be the same, which decreases the efficiency of a merge/AMVP candidate list. A pruning process is applied to solve this problem. The pruning process compares one candidate against the others in the current candidate list to avoid inserting identical candidate in certain extent. To reduce the complexity, only limited numbers of pruning processes are applied instead of comparing each potential candidate with all the other existing candidates.

Video encoder 200 and video decoder 300 may be configured to perform template matching (TM) prediction. TM prediction is a special merge mode based on Frame-Rate Up Conversion (FRUC) techniques. In this mode, motion information for a block is not signaled but derived at decoder side. TM prediction may be applied to both AMVP mode and regular merge mode. In AMVP mode, MVP candidate selection is determined based on template matching identifying candidate that results in the minimal difference between a current block template and a reference block template. In regular merge mode, a TM mode flag may be signaled to indicate the use of TM and then TM may be applied to the merge candidate indicated by merge index for MV refinement.

Figure 5:
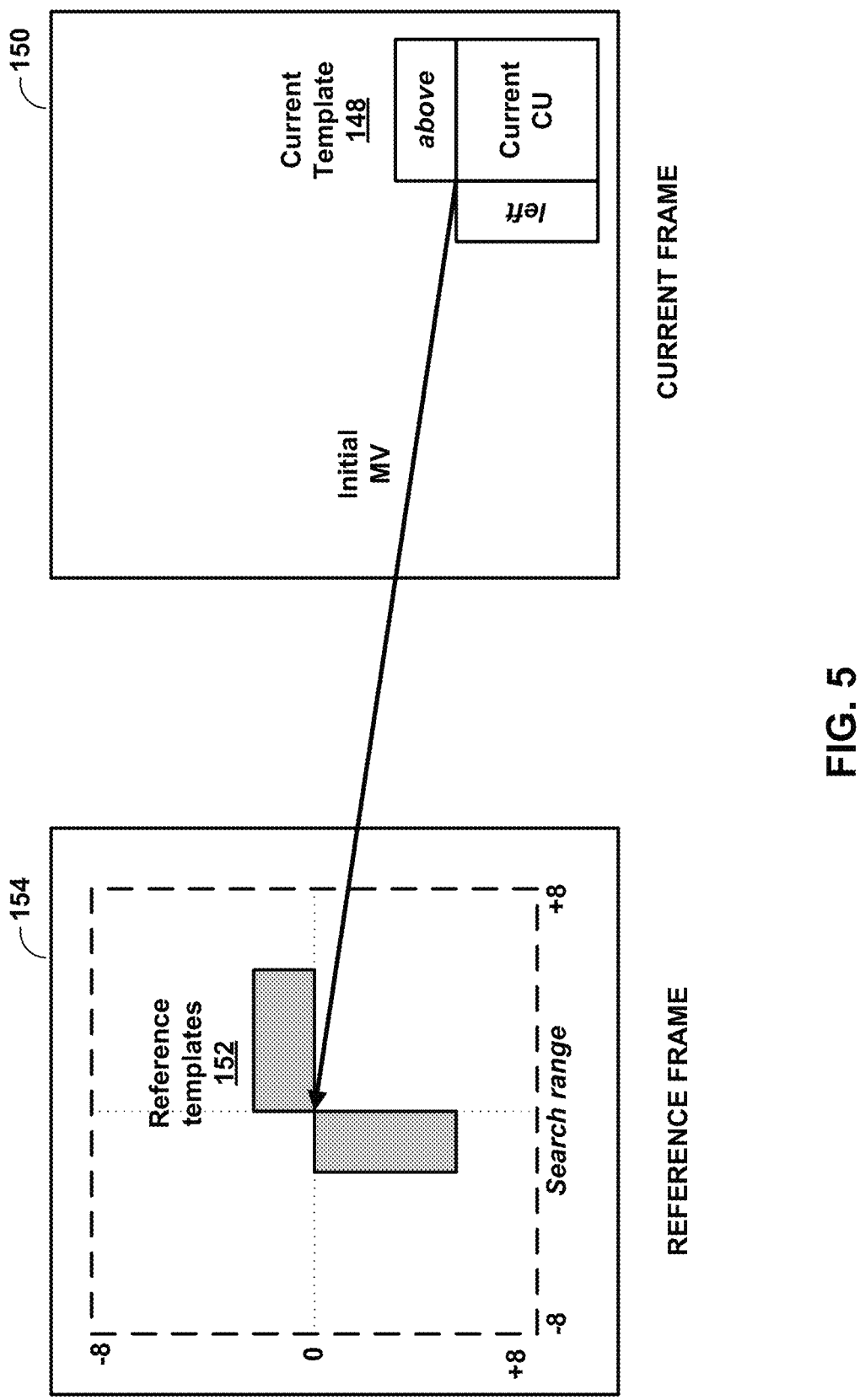
FIG. 5 illustrate an example template matching process.

FIG. 5 shows an example template matching process being performed on a search area around an initial MV. As shown in FIG. 5, video encoder 200 and video decoder 300 may be configured to use template matching to derive motion information of the current CU by finding the closest match between current template 148 (top and/or left neighboring blocks of the current CU) in current picture 150 and a template within reference templates 152 for a reference block (same size to the template) in reference picture 154. With an AMVP candidate selected based on initial matching error, video encoder 200 and video decoder 300 may refine the MVP with template matching. With a merge candidate indicated by a signaled merge index, the merged MVs corresponding to L0 and L1 may be refined independently by template matching. The less accurate of the merged MV may then be further refined based on the more accurate merged MV.

Video encoder 200 and video decoder 300 may be configured to implement a cost function. When a motion vector points to a fractional sample position, motion compensated interpolation is needed. To reduce complexity, bi-linear interpolation instead of regular 8-tap DCT-IF interpolation may be used for both template matching to generate templates in reference pictures. An example matching cost C for template matching may be calculated as follows:

$$C=SAD+w \cdot (|MV_x-MV_x^s|+|MV_y-M_y^s|)$$

where w is a weighting factor which is empirically set to 4, MV and $MV^s$ indicate the currently testing MV and the initial MV (e.g., an MVP candidate in AMVP mode or a merged MV in merge mode), respectively. SAD is used as the matching cost of template matching.

When TM is used, video encoder 200 and video decoder 300 may be configured to refine the motion vector (e.g., the initial MV) using luma samples only. The motion vector determined based on the refinement, however, may be used for both luma and chroma for MC inter prediction. After a MV is determined, final MC may be performed using an 8-tap interpolation filter for luma and a 4-tap interpolation filter for chroma.

Video encoder 200 and video decoder 300 may be configured to implement a search process. MV refinement may include a pattern-based MV search process with the criterion of template matching cost and utilizing a hierarchical structure. Two search patterns are supported—a diamond search and a cross search for MV refinement. The hierarchical structure specifies an iterative process to refine a MV, starting at a coarse MVD precision (e.g., quarter-pel) and ending at a finer precision (e.g., ⅛-pel). For example, a quarter-pel MV precision implies that a template matching process is performed on a search area around an initial MV to identify a refined MV where a step size of the search uses a quarter of a luma-sample distance (or resolution) as the MVD precision (between the initial MV and the refined MV). The MV is directly searched at a quarter luma sample MVD precision with a diamond pattern, followed by quarter luma sample MVD precision with a cross pattern, and then this is followed by one-eighth luma sample MVD refinement with cross pattern. The search range of MV refinement is set equal to (−8, +8) luma samples around the initial MV. When the current block is of bi-prediction, both MVs are refined independently, and then the best of which (in terms of matching cost) is set as a prior to further refine the other MV with BCW weight values.

Video encoder 200 and video decoder 300 may be configured to perform bilateral matching prediction. Bilateral matching, also referred to as bilateral merge, (BM) prediction is another merge mode based on FRUC techniques. When applying BM mode to a block, video encoder 200 and video decoder 300 may derive two initial motion vectors MV0 and MV1 using a signaled merge candidate index to select the merge candidate in a constructed merge list. When implementing bilateral matching, video encoder 200 and video decoder 300 search around the MV0 and MV1 and derive the final MV0' and MV1' based on a minimum bilateral matching cost.

Figure 6:
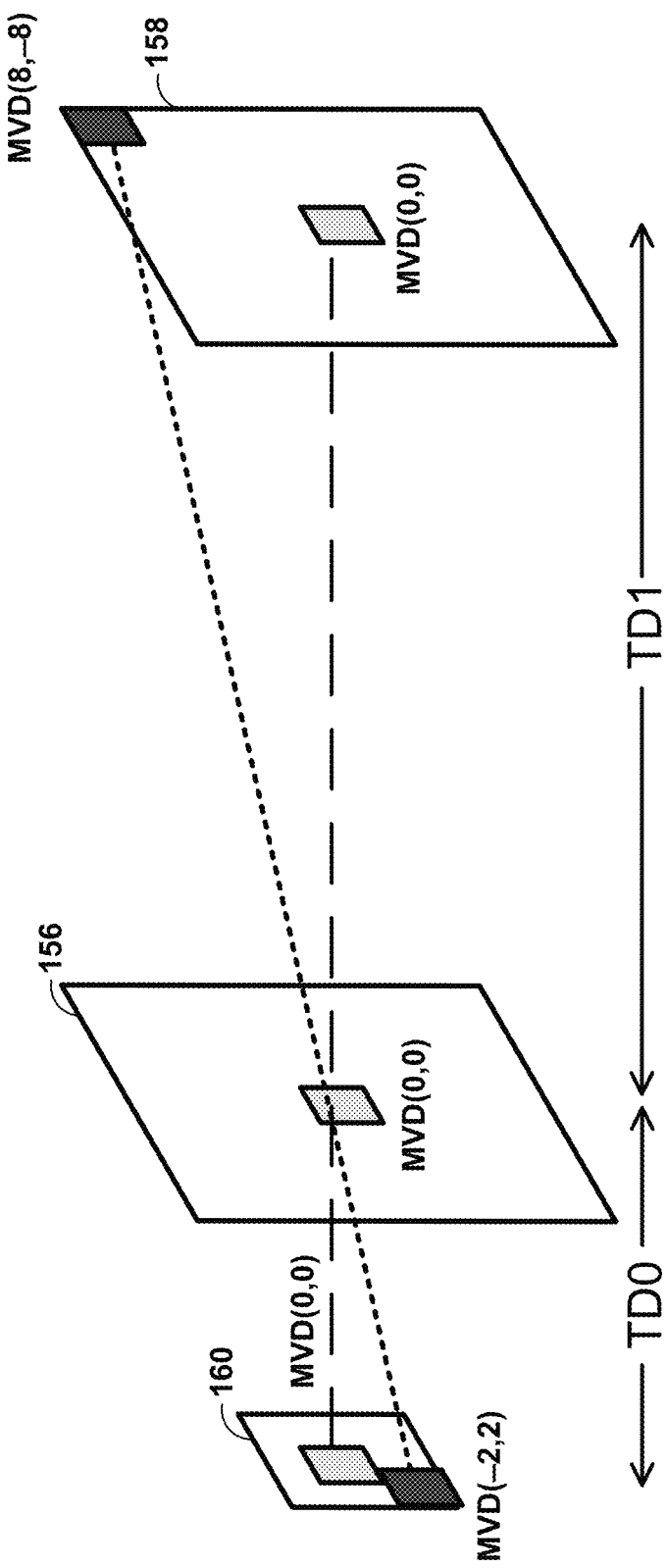
FIGS. 6 and 7 show examples of motion vector differences with respect to temporal distances.

The motion vector difference MVD0 (denoted by MV0'-MV0) and MVD1 (denoted by MV1'-MV1) pointing to the two reference blocks may be proportional to the temporal distances (TD), e.g. TD0 and TD1, between the current picture and the two reference pictures. FIG. 6 shows an example of MVD0 and MVD1 where the distance (TD1) between current picture 156 and reference picture 158 is 4-times the distance (TD0) between current picture 156 and reference picture 160. FIG. 6 shows an example of MVD0 and MVD1 being proportional based on the temporal distances.

Figure 7:
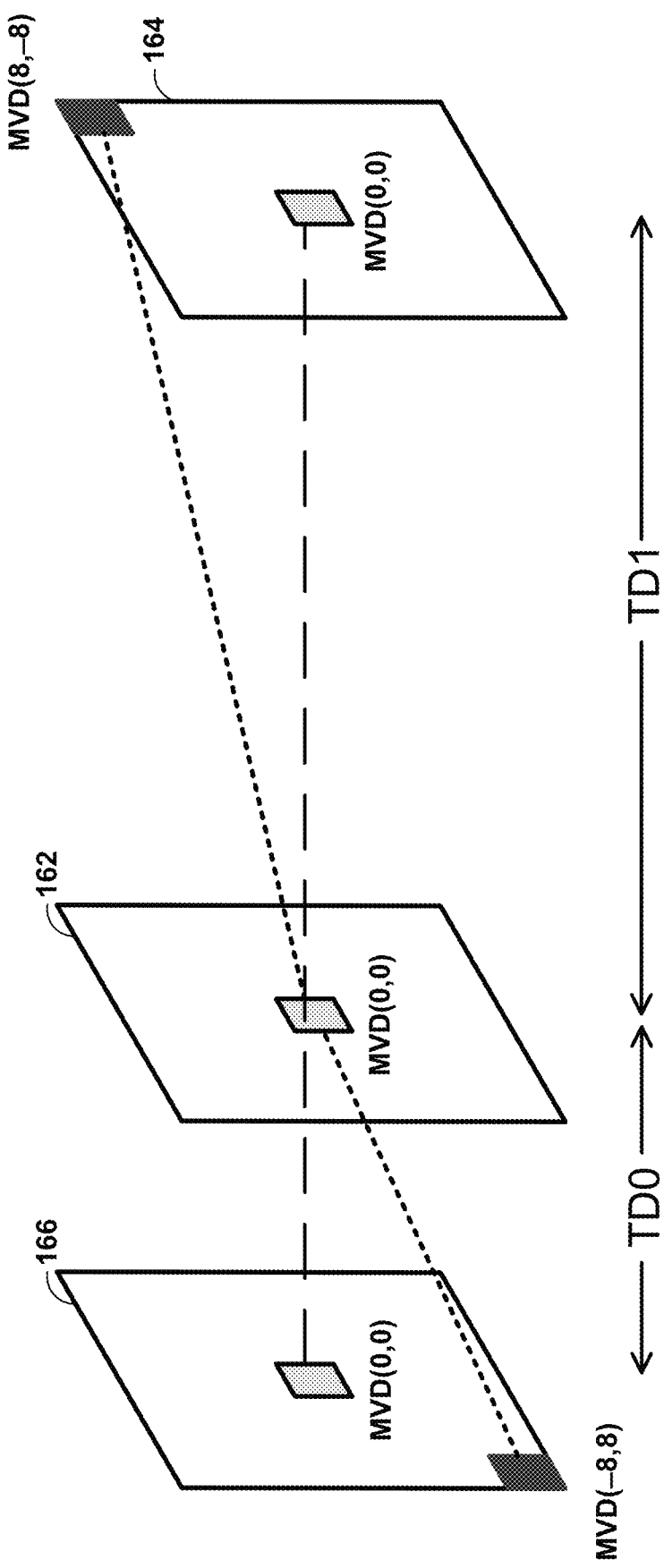

However, there is an optional design where MVD0 and MVD1 are mirrored regardless of the temporal distances TD0 and TD1. FIG. 7 shows an example of MVD0 and MVD1 being mirrored regardless of the temporal distance (TD1) between current picture 162 and reference picture 164 and the temporal distance (TD0) between current picture 162 and reference picture 166. FIG. 7 shows an example of mirrored MVD0 and MVD1, where TD1 is 4-times of TD0.

Figure 8:
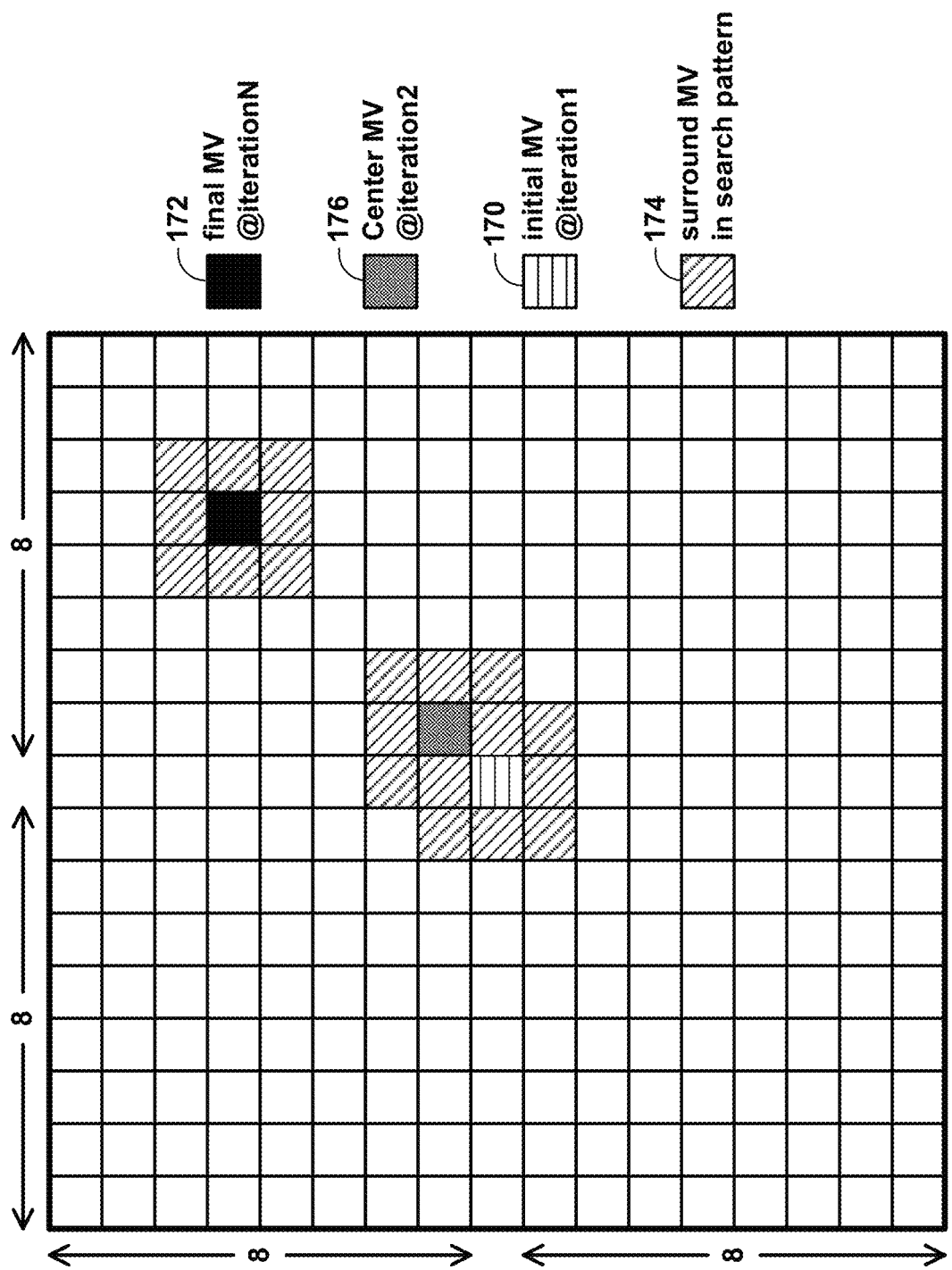
FIG. 8 shows an example search pattern for bilateral matching.

FIG. 8 shows an example of 3×3 square search patterns in the search range [−8, 8] for implementing bilateral matching. When implementing bilateral matching, video encoder 200 and video decoder 300 may be configured to perform a local search around the initial MV0 and MV1 to derive the final MV0' and MV1'. In the example of FIG. 8, the initial MV points to sample 170, and the final MV points to sample 172. The local search applies a 3×3 square search pattern to loop through the search range [−8, 8]. Samples 174 represent examples of samples in the search range around samples 170, 172, and sample 176. Sample 176 represents an example of a sample corresponding to a MV determined during an intermediate iteration of the search process. In each search iteration, the bilateral matching cost of the eight surrounding MVs in the search pattern are calculated and compared to the bilateral matching cost of center MV. The MV which has minimum bilateral matching cost becomes the new center MV in the next search iteration. The local search is terminated when the current center MV has a minimum cost within the 3×3 square search pattern or the local search reaches the pre-defined maximum search iteration.

Video encoder 200 and video decoder 300 may be configured to perform decoder-side motion vector refinement (DMVR). In VVC, DMVR may be applied to increase the accuracy of the MVs of the merge mode. In bi-prediction operation, a refined MV is searched around the initial MVs in the reference picture list L0 and reference picture list L1. The DMVR process calculates the distortion between the two candidate blocks in the reference picture list L0 and list L1.

Figure 9:
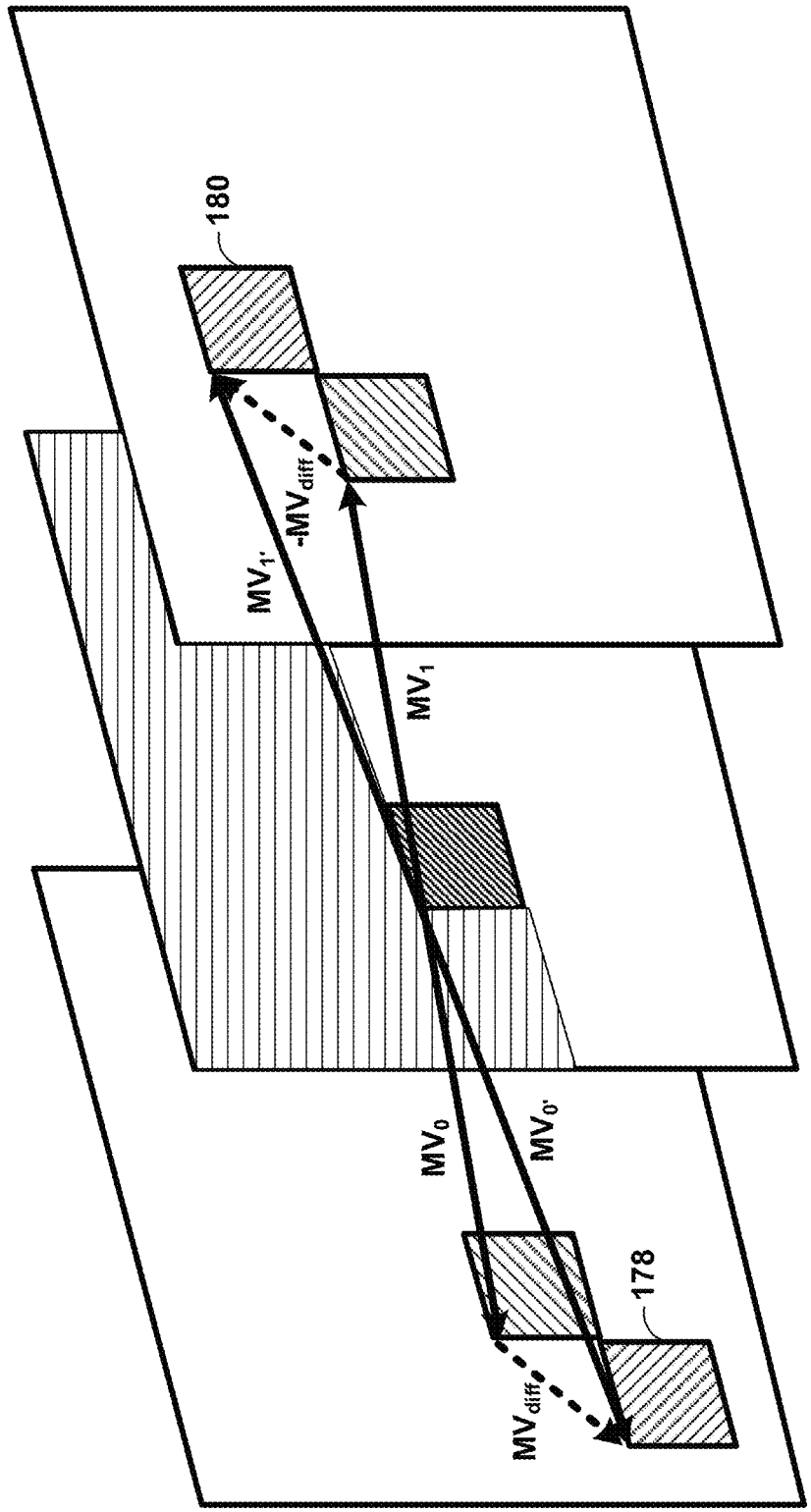
FIG. 9 shows an example decoding side motion vector refinement process.

FIG. 9 shows an example of decoder-side motion vector refinement. As illustrated in FIG. 9, video encoder 200 and video decoder 300 may be configured to calculate the SAD between block 178 and block 180 based on each MV candidate around the initial MV. The MV candidate with the lowest SAD becomes the refined MV and used to generate the bi-predicted signal.

The refined MV derived by the DMVR process is used to generate the inter prediction samples and also used in temporal motion vector prediction for future picture coding. While the original MV is used in deblocking processes and also used in spatial motion vector prediction for future CU coding. DMVR is a subblock-based merge mode with a pre-defined maximum processing unit of 16×16 luma samples. When the width and/or height of a CU are larger than 16 luma samples, the CU may be further split into subblocks with width and/or height equal to 16 luma samples.

Video encoder 200 and video decoder 300 may be configured to implement a searching scheme. In DVMR, the search points are surrounding the initial MV and the MV offset obey the MV difference mirroring rule. In other words, any points that are checked by DMVR, denoted by candidate MV pair (MV0, MV1) obey the following two equations:

$$MV0'=MV0+MV\_\text{offset}$$

$$MV1'=MV1-MV\_\text{offset}$$

Where MV_offset represents the refinement offset between the initial MV and the refined MV in one of the reference pictures. In DMVR, the refinement search range is two integer luma samples from the initial MV. The searching includes the integer sample offset search stage and fractional sample refinement stage.

Video encoder 200 and video decoder 300 may be configured to apply a 25-point full search for integer sample offset searching. The SAD of the initial MV pair is first calculated. If the SAD of the initial MV pair is smaller than a threshold, the integer sample offset search stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

Following the integer sample search, video encoder 200 and video decoder 300 may be configured to perform fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form:

$$E(x,y)=A(x-x_{min})^2+B(Y-y_{min})^2+C$$

where ($x_{min}$, $y_{min}$) corresponds to the fractional position with the least cost and C corresponds to the minimum cost value. By solving the above equations by using the cost value of the five search points, the ($x_{min}$, $y_{min}$) is computed as:

$$x_{min}=(E(-1,0)-E(1,0))/(2(E(-1,0)+E(1,0)-2E(0,0)))$$

$$y_{min}=(E(0,-1)-E(0,1))/(2((0,-1)+E(0,1)-2E(0,0)))$$

The value of $x_{min}$ and $y_{min}$ are automatically constrained to be between −8 and 8 since all cost values are positive and the smallest value is E(0,0). This corresponds to a half-pel offset with 1/16th-pel MV precision in VVC. The computed fractional ($x_{min}$, $y_{min}$) are added to the integer distance refinement MV to get the sub-pixel accurate refinement delta MV.

Video encoder 200 and video decoder 300 may be configured to perform bilinear-interpolation and sample padding. In VVC, the maximum resolution of the MVs is 1/16 luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, may be padded from those available samples.

Video encoder 200 and video decoder 300 may be configured to implement one or more enabling conditions for DMVR. In one example, video encoder 200 and video decoder 300 may be configured to enable DMVR if the following conditions are all satisfied, e.g., present or true.

CU level merge mode with bi-prediction MV
One reference picture is in the past and another reference picture is in the future with respect to the current picture
The distances (e.g., POC difference) from both reference pictures to the current picture are same
CU has more than 64 luma samples
Both CU height and CU width are larger than or equal to 8 luma samples
BCW weight index indicates equal weight
WP is not enabled for the current block
Combined intra and inter prediction (CIIP) mode is not used for the current block Video encoder 200 and video decoder 300 may be configured to implement merge mode with motion vector difference (MMVD). MMVD is a merge mode which allows signaling additional motion vector difference explicitly to refine the motion field of merge mode. A MMVD flag may be signaled right after sending a skip flag, merge flag and regular merge flag to indicate whether MMVD mode is used for a CU. In MMVD, after a merge candidate is selected, the merge candidate is further refined by the signaled MVDs information. The further information includes a merge candidate flag, an index to specify motion magnitude, and an index for indication of motion direction. In MMVD mode, one for the first 2 candidates in the merge list is selected to be used as MV basis. The merge candidate flag is signaled to specify which one is used.

Figure 10:
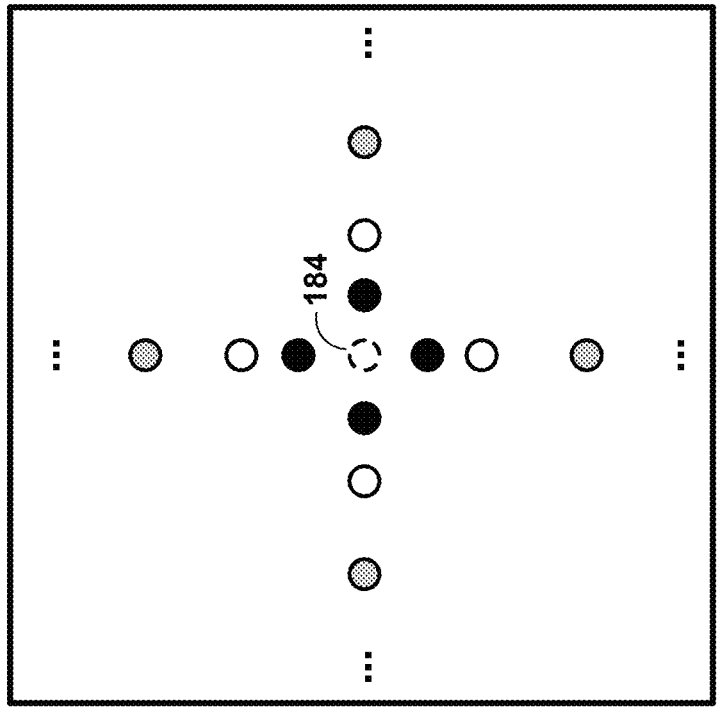
FIG. 10. shows an example of a merge mode with motion vector difference (MMVD) search point.
Figure 10:
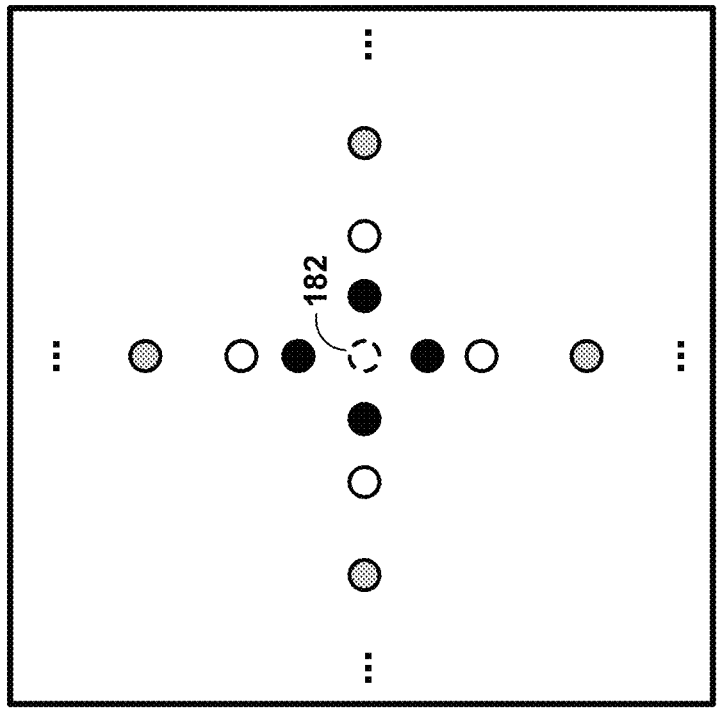

FIG. 10 shows an example of a an MMVD search point. Points 182 and 184 represent starting points identified by a starting MV. The other points correspond to refined motion vectors. A distance index specifies motion magnitude information and indicates the pre-defined offset from the starting point. As shown in FIG. 10, an offset may be added to either a horizontal component or a vertical component of starting MV. The relation of distance index and pre-defined offset is defined as $2^{idx-2}$, where the index (idx) is an integer ranging from 0 to 7. When a picture header syntax (e.g., pic_fpel_mmvd_enabled_flag) is set to enabled, index-to-offset mapping may be changed to be $2^{idx}$.

A direction index represents the direction of the MVD relative to the starting point. The direction index can represent of the four directions, as shown in the below table, where 00, 01, 10 and 11 denote right, left, up and down, respectively. The MVD sign may vary according to the type of the starting MVs. When the starting MVs is an un-prediction MV or bi-prediction MVs with both lists point to the same side of the current picture (i.e. POCs of two references are both larger than the POC of the current picture, or are both smaller than the POC of the current picture), the sign in the below table specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), the sign in the table below specifies the sign of MV offset added to the list0 MV component of starting MV and the sign for the list1 MV has opposite value.

| Direction IDX | 00 | 01 | 10 | 11 |
|---|---|---|---|---|
| x-axis | + | − | N/A | N/A |
| y-axis | N/A | N/A | + | − |

Prior techniques for performing template matching (TM), e.g., as described above with respect to template matching prediction, may result in degraded performance when used in conjunction with AMVP and merge modes. In AMVP mode, TM begins from refining initial MVs with a quarter-pel step size, regardless of the MV precision of adaptive motion vector resolution (AMVR). Yet, to ensure the refined MV has the intended precision from AMVR (quarter-luma-sample, half-luma-sample, integer-luma-sample or four-luma-sample), the motion vector predictors for a CU in prior techniques are rounded to a same precision as that of the MVD before being added together with the MVD. A rounding error on refined MVs may thus be unavoidable. In merge mode, TM works as an independent mode without considering potential combinations or interactions with other merge modes, such as MMVD and bilateral matching, resulting in lower performance in terms of coding gain. This disclosure describes techniques that may address these issues.

Video encoder 200 and video decoder 300 may be configured to implement MV precision for TM based on AMVR. The techniques of this disclosure may align the finest MV precision of TM with the indication of AMVR. TM, as described above with respect to template matching prediction, always refines the initial MV(s) with a quarter-pel step size, even if there is an explicit indication of an AMVR choice, resulting in a potential rounding error on the resulting refined MV(s). For example, if the initial MV is (0, 0) with integer-pel AMVR, then the TM-refined MV may be (0.25, 0.25). Due to rounding, the TM-refined MV may be rounded to something else rather than the searched one, triggering an unexpected rounding error on the TM-refined MV to the precision of the motion vector (e.g., as indicated with AMVR) and essentially wasting the computational power dedicated to performing the decoder-side search. To avoid this potential source of error, this disclosure describes techniques to force the searching step size of TM to be aligned with an indicated AMVR. In particular, with a given AMVR mode (e.g., 4-pel, 1-pel, half-pel, quarter-pel, ⅛-pel, 1/16-pel, and so on for all power-of-2 precisions), video encoder 200 and video decoder 300 may be configured to stop the refinement process of TM at the same MV precision indicated by AMVR and not go beyond that MV precision. In other words, the TM-refined MV may be restricted to having a MV precision that is equal to or greater, but not less than, the MV precision of the AMVR mode.

Video encoder 200 and video decoder 300 may be configured to determine the initial step size of a TM MV refinement process with a hierarchical search pattern based on the MV precision of the AMVR mode. The initial step size can be the same precision as that of AMVR or something greater. In general, when the AMVR specifies an N-pel MV precision (e.g., N is a power-of-2 number, including 4, 1, ½, ¼, ⅛, 1/16), the initial step size may, for example, be M-pel which is set equal to N, 2N, 4N or something larger with a power-of-2 scale. Thus, video encoder 200 and video decoder 300 may be configured to implement a search process as described above with respect to template matching prediction as a fourfold process.

First, video encoder 200 or video decoder 300 may search the initial MV at the M-pel luma sample MV precision with a given search pattern (e.g., diamond, square, cross). Then, video encoder 200 or video decoder 300 may further refine the refined MV at the same M-pel luma sample MV precision with another search pattern that is the same as or different from the one used in the previous process. Then, video encoder 200 or video decoder 300 may further refine the refined MV iteratively with a 2-time finer luma sample MV precision (e.g., from n-pel to n/2-pel) than that of the previous iteration with a given search pattern. Video encoder 200 or video decoder 300 may continue the iteration process until the precision reaches the N-pel MV precision indicated by AMVR.

In one example, given a quarter-pel (¼-pel) AMVR coded block, video encoder 200 or video decoder 300 may determine the initial step size of the TM MV refinement process to be equal to 1-pel. Then, video encoder 200 or video decoder 300 begins a TM MV refinement process at 1-pel precision, followed by a second round of refinement at ½-pel precision, stopped at the third round of refinement at ¼-pel precision.

In one example, the values of (M, N) can be (4, 4) for 4-pel AMVR, (1, 1) for 1-pel AMVR, (1, ½) for half-pel AMVR, (1, ¼) for quarter-pel AMVR, (1, ⅛) for ⅛-pel AMVR and (1, 1/16) for 1/16-pel AMVR. In some cases (e.g., merge mode) when AMVR is not always indicated in the bitstream explicitly, the setting of (M, N) can be specified as (1, ¼), (1, ⅛), or (1, 1/16) at sequence, picture, slice, tile, sub-picture level or pre-defined. In these examples, M represents the initial step size, and N represents the final step size, which is greater than or equal to a precision of the initial MV.

In one example, the value of M can be sequence-resolution-dependent. In general, for a higher-resolution sequence, video encoder 200 and video decoder 300 may use a larger value of M and for a lower-resolution sequence may use a smaller value of M.

Video encoder 200 and video decoder 300 may be configured to perform a simplified bi-directional refinement for TM. The techniques of this disclosure may simplify TM by removing one of the uni-directional MV refinement processes for a bi-predicted block. When the current inter block is encoded using bi-prediction, the TM as described above with respect to template matching prediction, refines each uni-directional MV independently, and then the one (i.e., referred hereafter as second MV) with a larger matching error is further refined by using the other one (i.e., referred hereafter as first MV) as a prior for joint optimization. However, since both MVs are refined toward finding an optimal matching for the same current block template, the joint optimization may have reduced the chance to reach a better prediction for bi-prediction case. In general, the second MV in bi-prediction is used to better compensate the delta signal between the original block samples and the prediction samples corresponding to the first MV. Thus, this disclosure describes techniques to simplify TM as a twofold MV refinement process. Video encoder 200 and video decoder 300 may first choose a first MV in bi-prediction for independent refinement and then take the TM-refined first MV as a prior to refine the second MV.

There are several processes that may be used for specifying the criteria to pick the first MV for independent refinement. For example, $MV_{Lx}$, may be the only one to be refined independently and is set as a prior to refine the other MV with BCW weight values, where Lx can be pre-defined as either L0 or L1 or specified at sequence, picture, slice, tile, sub-picture, CTU or block level. Lx may be determined based on whichever reference picture has a shorter POC distance toward the current one. In some examples, Lx may be determined based on whichever reference picture has a longer POC distance relative to the current picture. In some examples, Lx may be determined based on whichever reference picture has a smaller quantization parameter (QP) value. In some examples, Lx may be determined based on whichever reference picture has a larger QP value. In some examples, Lx may be set equal to be L0 when ph_mvd_l1_zero_flag is enabled. (It is noted ph_mvd_l1_zero_flag may be named differently in various video standards, but its functionality remains the same, that is, forcing $MVD_{Lx}$ to be zero and skipping syntax signaling for $MVD_{L1}$.) In some examples, Lx may be set equal to be L0 when ph_mvd_l1_zero_flag is disabled. In some examples, Lx may be determined based on whichever of MVL0 and MVL1 can produce a lower matching cost before MV refinement process of TM takes place. The matching cost could be the same as the template matching cost (i.e., template matching prediction as described above) or sub-sampled template matching cost which only consider every other N (e.g., 2, 3, 4, . . . ) samples from template blocks into matching cost calculation.

In other examples, Lx may be determined based on whichever of $MV_{L0}$ and $MV_{L1}$ can produce a lower matching cost after MV refinement process of TM takes place on both MVs. Then, the best of which (in terms of matching cost) is set as a prior to refine the original vector of the other MV (before MV refinement) with BCW weight values.

Video encoder 200 and video decoder 300 may be configured to implement bilateral matching for TM merge mode. The techniques of this disclosure may extend the notion of bilateral matching to TM merge mode (called bilateral TM or TM bilateral) when the current CU is of bi-prediction. With it, the matching process of TM becomes finding the best matching that can minimize the difference between the two reference block templates. It is noted that bilateral TM is different from bilateral matching, as described above, which refines MVs based on the minimum cost between two reference blocks, while bilateral TM refines MVs based on the minimum cost between two templates.

In one example, when the CU is of bi-prediction, for TM, video encoder 200 and video decoder 300 may be configured to skip the MV refinement process (i.e., $TM_{2uni}$) for each uni-directional MV but apply bilateral TM that finds the best matching to minimize the delta between the two reference block templates. In short, the processing order is denoted as $\{TM_{bilateral}\}$.

In another example, when the CU is of bi-prediction, for TM, video encoder 200 and video decoder 300 may be configured to still perform MV refinement process for each uni-directional MV independently. Then, video encoder 200 and video decoder 300 may be configured to perform bilateral TM on top of the refined MVs to find the best matching to minimize the delta between the two reference block templates. In short, the processing order is denoted as $\{TM_{2uni}, TM_{bilateral}\}$.

In some examples, when the CU is of bi-prediction, for TM, video encoder 200 and video decoder 300 may be configured to still perform a regular MV refinement process to refine each uni-directional MV independently, followed by a joint optimization (i.e., $TM_{bi}$) as described above with respect to template matching prediction for the MV which incurs a larger matching cost. Then, video encoder 200 and video decoder 300 may be configured to perform bilateral matching on top of the refined MVs to find the best matching to minimize the delta between the two reference block templates. In short, the processing order is denoted as $\{TM_{2uni}, TM_{bi}, TM_{bilateral}\}$.

The processing order of some of the aforementioned examples above may be reversed, in which bilateral TM is performed prior to regular TM. In short, the processing order is $\{TM_{bilateral}, TM_{2uni}\}$ or $\{TM_{bilateral}, TM_{2uni}, TM_{bi}\}$.

As compared to some of the aforementioned examples, the bilateral TM may be replaced by using regular bilateral matching or PU-based DMVR. In short, the processing order covers, but not limited to, $\{TM_{2uni}, BM\}$, $\{TM_{2uni}, TM_{bi}, BM\}$, $\{BM, TM_{2uni}\}$ and $\{BM, TM_{2uni}, TM_{bi}\}$. It is noted that BM can be replaced by using DMVR depending on whichever one of BM and DMVR is realized in a video codec.

In one example, when the CU is encoded with bi-prediction, video encoder 200 and video decoder 300 may be configured to apply subblock-based DMVR or subblock-based BM to the resulting motion field after both regular TM and bilateral TM are performed. Thus, the processing order of these decoder-side modes are summarized as follows:
  $\{TM_{2uni}, BM, \text{Subblock BM}\}$ or $\{TM_{2uni}, TM_{bilateral}, \text{Subblock BM}\}$;
  $\{TM_{2uni}, TM_{bi}, BM, \text{Subblock BM}\}$ or $\{TM_{2uni}, TM_{bi}, TM_{bilateral}, \text{Subblock BM}\}$;
  $\{BM, TM_{2uni}, \text{Subblock BM}\}$ or $\{TM_{bilateral}, TM_{2uni}, \text{Subblock BM}\}$;
  $\{BM, TM_{2uni}, TM_{bi}, \text{Subblock BM}\}$ or $\{TM_{bilateral}, TM_{2uni}, TM_{bi}, \text{Subblock BM}\}$.

It is noted that BM can be replaced by using DMVR depending on whichever one of BM and DMVR is realized in a video codec.

Building on examples above, PU-based BM or $TM_{bilateral}$ can be removed to reduce complexity overhead, resulting in:
  $\{TM_{2uni}, \text{Subblock BM}\}$;
  $\{TM_{2uni}, TM_{bi}, \text{Subblock BM}\}$;
  $\{TM_{2uni}, \text{Subblock BM}\}$;
  $\{TM_{2uni}, TM_{bi}, \text{Subblock BM}\}$.

It is noted that BM can be replaced by using DMVR depending on whichever one of BM and DMVR is realized in a video codec.

In one example, when the CU is of bi-prediction, video encoder 200 and video decoder 300 may be configured to conditionally perform bilateral TM, following the same enabling condition described above as for DMVR. When the condition is not satisfied, video encoder 200 and video decoder 300 may be configured to perform TM without bilateral matching; otherwise, as when the condition is satisfied, bilateral matching performs for TM. It is noted that the same rule applies when bilateral BM is replaced by DMVR or BM.

In another example, building on examples above, $TM_{bi}$ may degenerate bi-prediction motion to uni-directional when the TM cost of bi-prediction is N times larger than that of the best uni-directional one, where N can be a pre-defined scale such as 1.125, 1.25, 1.5 and so on or specified at sequence, picture, slice, tile, sub-picture, CTU or block level. When such condition satisfies, the resulting motion field derived by TM becomes uni-directional which happens to skip BM and subblock BM.

In one example, video encoder 200 and video decoder 300 may be configured to conditionally skip the MV refinement process of TM merge mode based on the matching cost of BM or bilateral TM (depending on which approach is taken in, for instance, examples 4, 5, and 6 above). In the case when BM (or $TM_{bilateral}$) is applied before regular TM (i.e., $TM_{2uni}$ and $TM_{bi}$), the MV refinement process of the regular TM may be skipped if the bilateral matching cost of BM (or $TM_{bilateral}$) is less than a given threshold. The threshold may be defined as a function of number of block samples, that is, f(scale)=scale*number of block samples (or f(scale)=scale*number of template block samples, when $TM_{bilateral}$ is used), where the scale can be a positive real number, such as 0.5, 0.75, 1.0, 1.25, 1.50, 1.75, 2.0 and so on, specified per sequence, picture, subpicture, tile, slice or pre-defined.

In one example, the regular TM and/or bilateral TM can be embedded as one extra pass in multi-pass DMVR, for MV refinement before the subblock process. The regular TM or bilateral TM can be present right before (or right after) the first pass of multi-pass DMVR. The below summarizes all the possible combinations:
  $\{TM_{2uni}, \text{multi-pass DMVR}\}$;
  $\{TM_{2uni}, TM_{bi}, \text{multi-pass DMVR}\}$;
  $\{TM_{bilateral}, \text{multi-pass DMVR}\}$;
  $\{TM_{bilateral}, TM_{2uni}, \text{multi-pass DMVR}\}$;
  $\{TM_{bilateral}, TM_{2uni}, TM_{bi}, \text{multi-pass DMVR}\}$;
  $\{TM_{2uni}, TM_{bilateral}, \text{multi-pass DMVR}\}$;
  $\{TM_{2uni}, TM_{bi}, TM_{bilateral}, \text{multi-pass DMVR}\}$.

In one example, the regular TM and/or bilateral TM can replace the first pass of multi-pass DMVR, as described in U.S. Provisional Patent Application 63/129,221. The below summarizes all the possible combinations:
  $\{TM_{2uni}, \text{multi-pass DMVR with its first pass removed}\}$;

{$TM_{2uni}$, $TM_{bi}$, multi-pass DMVR with its first pass removed};
{$TM_{bilateral}$, multi-pass DMVR with its first pass removed};
{$TM_{bilateral}$, $TM_{2uni}$, multi-pass DMVR with its first pass removed};
{$TM_{bilateral}$, $TM_{2uni}$, $TM_{bi}$, multi-pass DMVR with its first pass removed};
{$TM_{2uni}$, $TM_{bilateral}$, multi-pass DMVR with its first pass removed};
{$TM_{2uni}$, $TM_{bi}$, $TM_{bilateral}$, multi-pass DMVR with its first pass removed}.

Video encoder 200 and video decoder 300 may be configured to implement MMVD with TM. The techniques of this disclosure apply TM to MMVD candidates for MV refinement. TM can be applied to either the base vectors of MMVD or each of the MMVD candidates.

In one example, TM is applied solely to MMVD base vectors. In one example, TM is applied solely to MMVD base vectors and the best of which is determined as the final MMVD base vector to generate MMVD candidates. With this, the flag that was sent to indicate the selection of MMVD base vector need not be signaled. In other words, the indices of the MMVD base vector is derived from TM, but not from decoding the bitstream. In one example, the MMVD base vector selection in previous example is simplified through that TM cost computed for each MMVD base vector without performing MV refinement. Only the one with a lower TM cost is selected as the MMVD base vector and is applied to MV refinement. The TM-refined vector is served as the MMVD base vector to generate MMVD candidates. It is noted that the flag that was sent to indicate the selection of MMVD base vector need not be signaled in this example. In one example, TM performs for each possible MMVD candidates. This example can work independently or combined with the aforementioned examples that refine MMVD base vectors. In one example, the MMVD base vectors can be subsampled from the regular merge candidate list or TM candidate list. The subsampling process may include subsampling the first N from the aforementioned candidate lists, where N can be pre-defined as 1, 2, 3, 4 and so on or specified at a sequence, slice, tile, picture, or subpicture level.

Video encoder 200 and video decoder 300 may be configured to utilize a matching cost based enabling condition. Bilateral matching for TM merge mode can be disabled conditionally based on the matching cost of BM or bilateral TM (depending on which approach is taken in examples 4, 5, and 6 above with respect to bilateral matching for TM merge mode. In the case when BM (or $TM_{bilateral}$) is applied before regular TM (i.e., $TM_{2uni}$ and $TM_{bi}$), the regular TM may be skipped if the bilateral matching cost of BM (or $TM_{bilateral}$) is less than a given threshold. The threshold may be defined as a function of number of block samples, that is, f(scale)=scale*number of block samples (or f(scale) =scale*number of template block samples, when $TM_{bilateral}$ is used), where the scale can be a positive real number, such as 0.5, 0.75, 1.0, 1.25, 1.50, 1.75, 2.0 and so on, specified per sequence, picture, subpicture, tile, slice or pre-defined.

Figure 11:
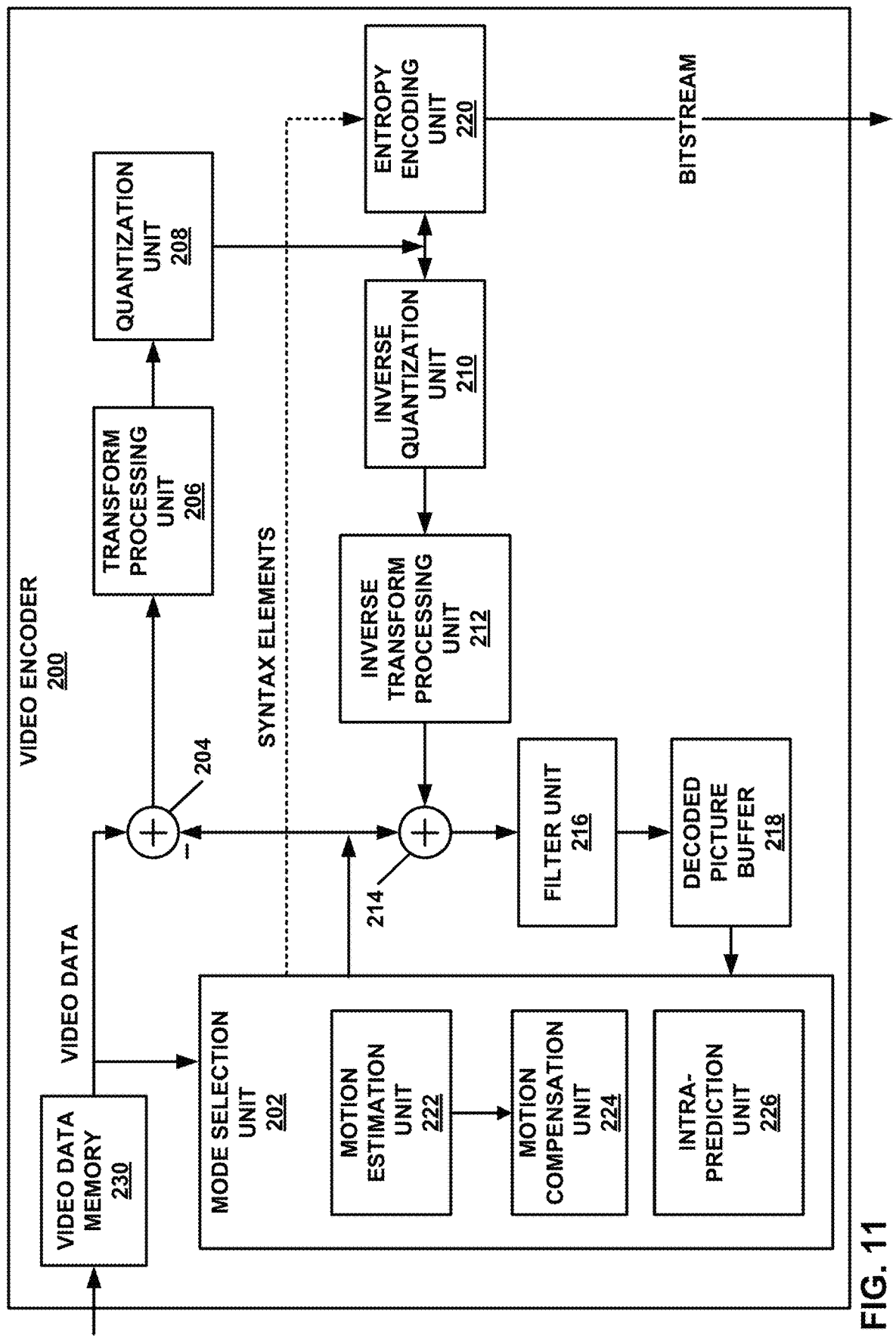
FIG. 11 is a block diagram illustrating an example video encoder that may perform the techniques of this disclosure.

FIG. 11 is a block diagram illustrating an example video encoder 200 that may perform the techniques of this disclosure. FIG. 11 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 11, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 11 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

In some coding scenarios, motion compensation unit 224 may generate a prediction block using motion vectors and motion vector refinement. The motion vector refinement may, for example, be based on template matching. For example, motion compensation unit 224 may identify an initial current block template based on a motion vector, search other templates around the initial current block template using a step size that is set to an initial step size, and iteratively reduce the step size from the initial step size until the step size is set to a final step size that equals the motion vector precision. Motion compensation unit 224 may perform the searching using a variety of different search patterns.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 12:
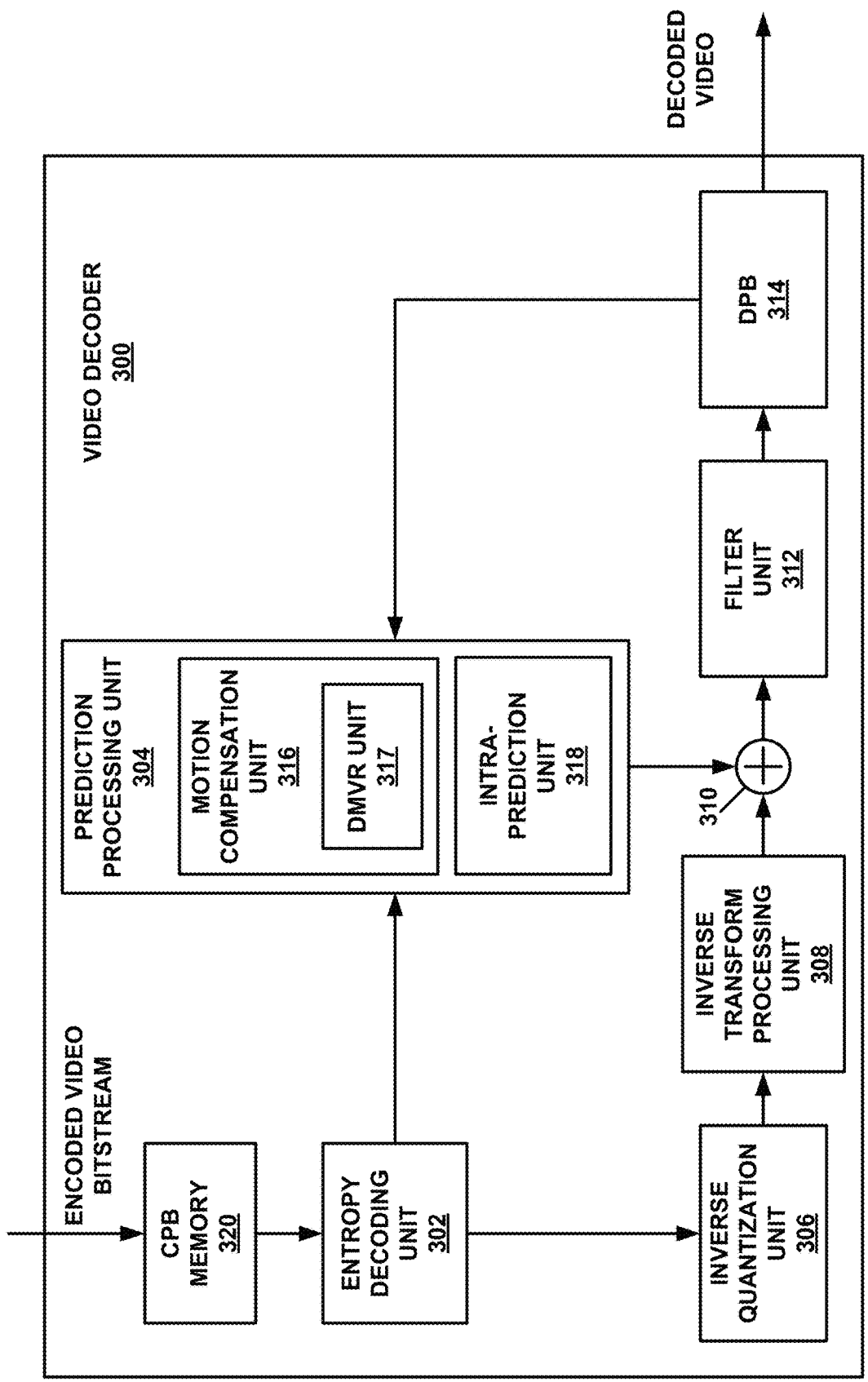
FIG. 12 is a block diagram illustrating an example video decoder that may perform the techniques of this disclosure.

FIG. 12 is a block diagram illustrating an example video decoder 300 that may perform the techniques of this disclosure. FIG. 12 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 12, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 12 are illustrated to assist with understanding the operations performed by video decoder 300. The units may be implemented as fixed-function circuits, programmable circuits, or a combination thereof. Similar to FIG. 11, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 11).

Motion compensation unit 316 includes DMVR unit 317, which may perform various techniques described in this disclosure including the TM techniques described herein. DMVR unit 317 may, for example, be configured to refine a motion vector based on TM by identifying a current block template within a current picture and searching within a search area for a final reference block template that corresponds to the current block template. To search within the search area, DMVR unit 317 may be configured to identify an initial reference block template based on the motion vector, search other reference block templates around the initial reference block template using a step size that is set to an initial step size, iteratively reduce the step size from the initial step size until the step size is set to a final step size that equals the motion vector precision. DMVR unit 317 may then determine a prediction block for the block based on the final reference block template. The prediction block may, for example, be a block to the bottom and right of the final reference block template as illustrated by FIG. 5.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 11). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 13:
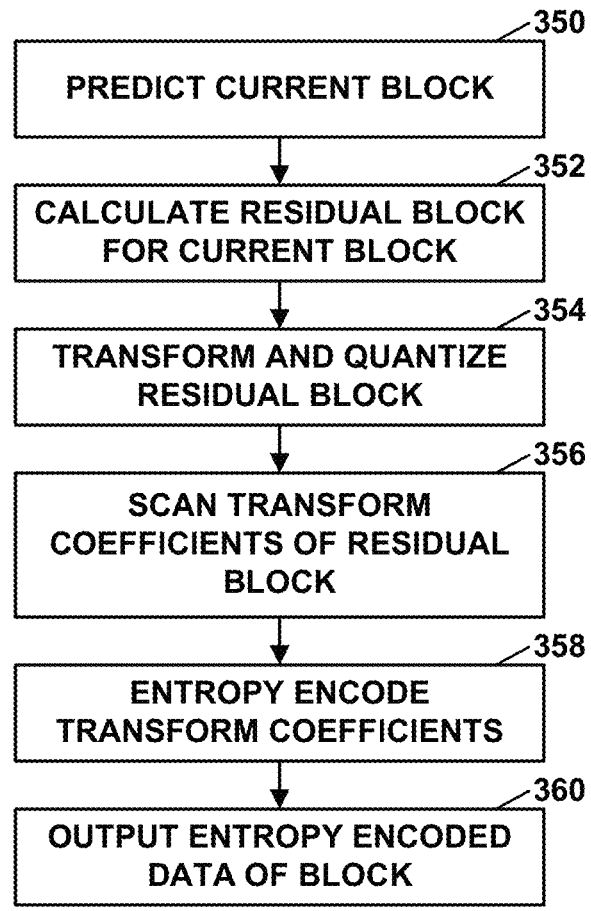
FIG. 13 is a flowchart illustrating an example process for encoding a current block in accordance with the techniques of this disclosure.

FIG. 13 is a flowchart illustrating an example process for encoding a current block in accordance with the techniques of this disclosure. The current block may comprise a current CU. Although described with respect to video encoder 200 (FIGS. 1 and 11), it should be understood that other devices may be configured to perform a process similar to that of FIG. 13.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 14:
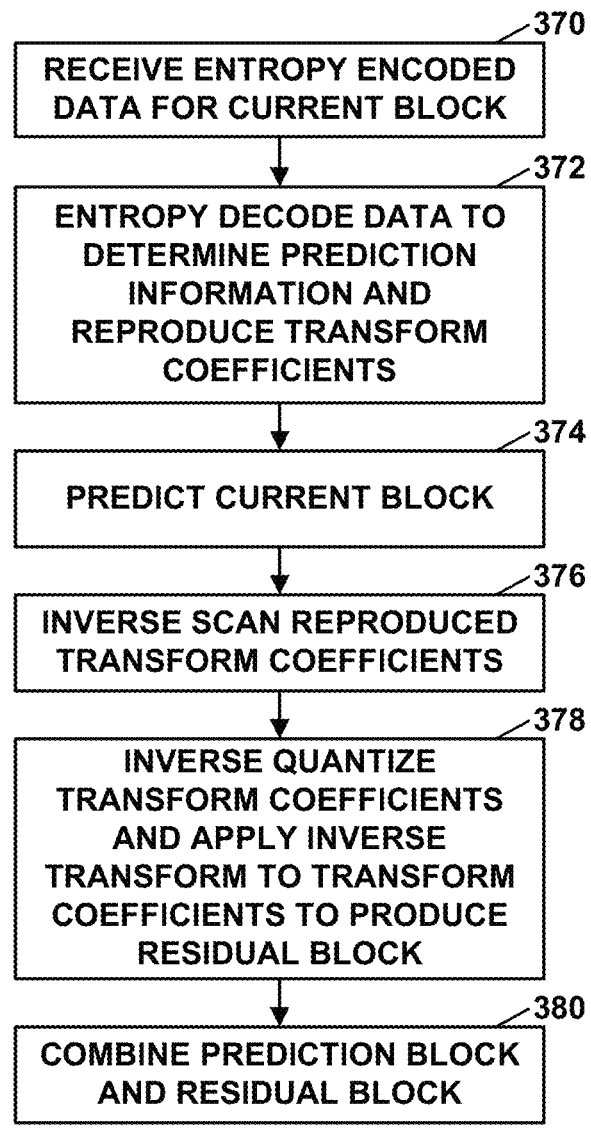
FIG. 14 is a flowchart illustrating an example process for decoding a current block in accordance with the techniques of this disclosure.

FIG. 14 is a flowchart illustrating an example process for decoding a current block of video data in accordance with the techniques of this disclosure. The current block may comprise a current CU. Although described with respect to video decoder 300 (FIGS. 1 and 12), it should be understood that other devices may be configured to perform a process similar to that of FIG. 14.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 15:
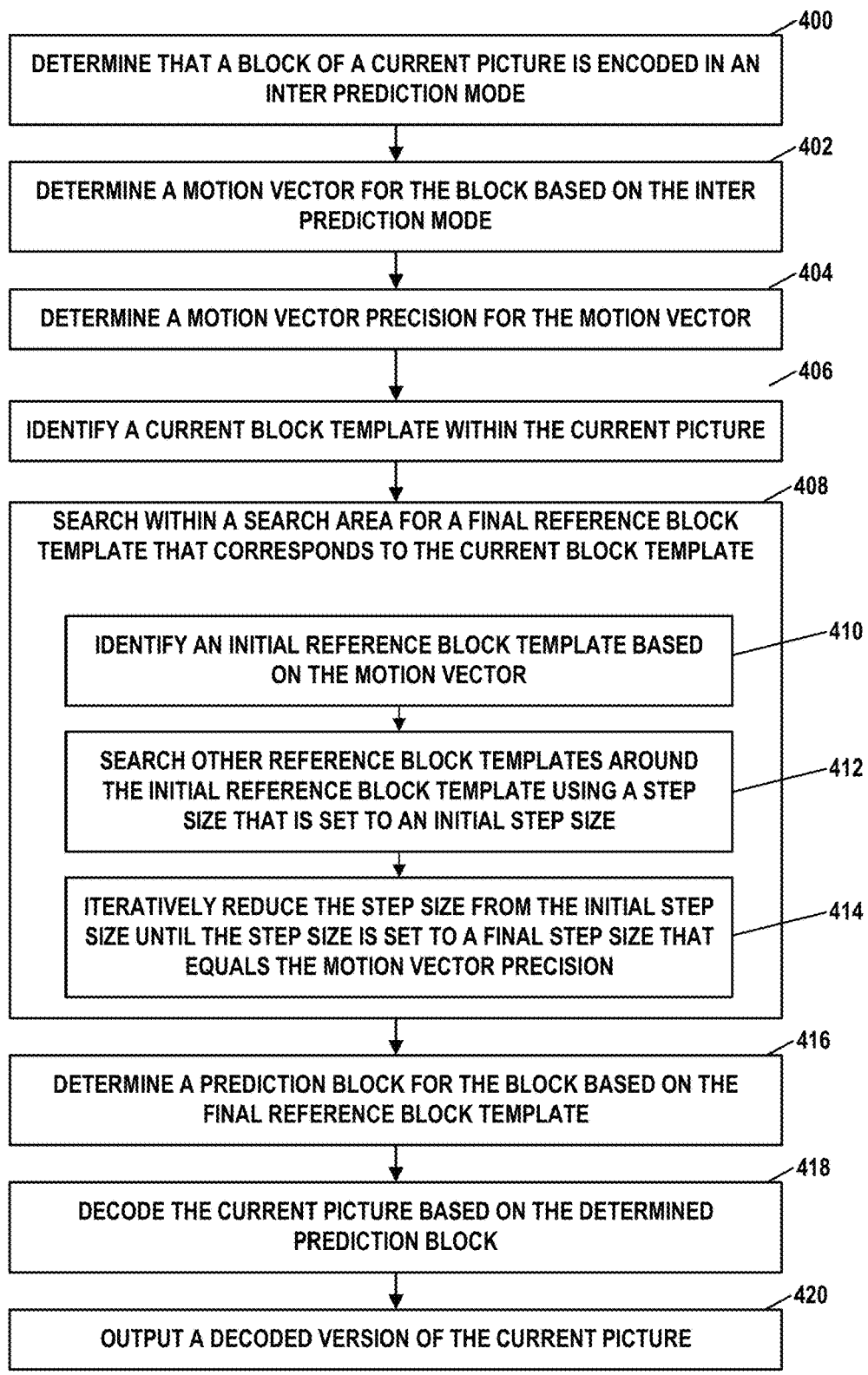
FIG. 15 is a flowchart illustrating an example process for decoding a current block in accordance with the techniques of this disclosure.

FIG. 15 is a flowchart illustrating an example process for decoding a current block in accordance with the techniques of this disclosure. The current block may comprise a current CU. FIG. 15 will be described with respect to a generic video decoder, which may, for example corresponds to a video decoder 300 (FIGS. 1 and 12) or to the video decoding loop of video encoder 200 (FIGS. 1 and 11). It should be understood, however, that other devices may be configured to perform a process similar to that of FIG. 15.

The video decoder determines that a block of a current picture is encoded in an inter prediction mode (400). The inter prediction mode may, for example, be an AMVP mode or a merge mode.

The video decoder determines a motion vector for the current block based on the inter prediction mode (402) and determines a motion vector precision for the motion vector (404). If, for example, the inter prediction mode is an AMVP mode, then the video decoder may determine the motion vector precision for the current block by receiving a syntax element in the bitstream indicating the motion vector precision. If, for example, the inter prediction mode is a merge mode, then the video decoder may determine the motion vector precision for the current block by determining the motion vector precision from a candidate in a merge list.

The video decoder identifies a current block template within the current picture (406). The video decoder may, for example, locate a template around the current block that includes samples that are to the top and left of the current block, as illustrated in FIG. 5, for example.

The video decoder searches within a search area for a final current block template that corresponds to the reference block template (408). The search area may, for example, be an area that is within 8 samples in an x-direction of a top-left sample of a reference block in a reference picture determined from the motion vector and within 8 samples in a y-direction of the top-left sample.

To search within the search area for the final reference block template that corresponds to the current block template, the video decoder identifies an initial reference block template based on the motion vector (410), searches other reference block templates around the initial reference block template using a step size that is set to an initial step size (412), and iteratively reduces the step size from the initial step size until the step size is set to a final step size that equals the motion vector precision (414).

In contrast to techniques that always use a default pel step size such as a ⅛ pel step size, in accordance with the techniques of this disclosure, the final step size may be greater than ⅛ pel in some coding scenarios. All values of the step size used for searching within the search area may be greater than or equal to the motion vector precision. The initial step size may, for example, be equal to n-pel and to iteratively reduce the step size from the initial step size until the step size is set to the final step size that equals the motion vector precision, the video decoder may reduce the step size from n-pel to n/2-pel and continue to reduce the step size by a factor of ½ until the step size is equal to the motion vector precision.

To iteratively reduce the initial step size until the final step size equals the motion vector precision, the video decoder may, for example, determine that the step size equals the motion vector precision, and in response to determining that the step size equals the motion vector precision, terminate the iteratively reducing of the step size. Additionally or alternatively, to iteratively reduce the initial step size until the final step size equals the motion vector precision, the video decoder may, for example, search the other templates around the initial current block template using the initial step size to determine a first refined motion vector; iteratively reduce the step size from the initial step size to a finer precision step size; identify a new initial current block template based on the first refined motion vector; and search a second group of other templates around the new initial current block template using the finer precision step size to determine a second refined motion vector. Additionally or alternatively, to iteratively reduce the initial step size until the final step size equals the motion vector precision, the video decoder may search the other templates around the initial current block template using the initial step size and a first search pattern to determine a first refined motion vector; identify a new initial current block template based on the first refined motion vector; and search a second group of other templates around the new initial current block template using the initial step size and a second search pattern to determine a second refined motion vector.

The video decoder determines a prediction block for the current block based on the final current block template (416). Due to the motion vector refinement process, the prediction block determined for the current block based on the final current block template may not be the same as an initial reference block identified by the motion vector.

The video decoder decodes the current picture based on the determined prediction block (418). The video decoder may, for example, add the determined prediction to a residual block to form a reconstructed block and perform one or more filtering operations on the reconstructed block.

The video decoder outputs a decoded version of the current picture (420). To output the decoded version of the current picture, the video decoder may be configured to output the decoded version of the current picture for display. In instances where the video decoder is a component of a video encoder, the video decoder may be configured to output the decoded version of the current picture by storing the decoded version of the current pictures for use in encoding subsequent blocks of the video data.

The following numbered clauses illustrate one or more aspects of the devices and techniques described in this disclosure.

Clause 1A. A method of decoding video data, the method comprising: determining that a current block of the video data is encoded in an inter-prediction mode; and decoding the current block of the video data using the inter-prediction mode.

Clause 2A. The method of clause 1A, wherein decoding the current block of the video data using the inter-prediction mode comprises: maintaining a candidate list for the current block; selecting a candidate from the candidate list; and decoding the current block of video data using motion information of the selected candidate.

Clause 3A. The method of clause 1A or 2A, further comprising: performing a template matching motion vector refinement process using an initial step size equal to or greater than a motion vector resolution of a motion vector used decoded the block.

Clause 4A. The method of any of clauses 1A-3A, wherein the inter prediction mode comprises a bi-directional inter prediction mode, the method further comprising: performing a template matching motion vector refinement process on a first uni-directional motion vector; and after performing the template matching motion vector refinement process on the first motion vector, performing the template matching motion vector refinement process on a second uni-directional motion vector.

Clause 5A. The method of clause 3A or 4A, wherein performing the template matching motion vector refinement process comprises: identifying an initial location in a reference picture based on a motion vector; performing template matching in a search region around the initial location decoding the current block of video data using the motion information of the selected candidate comprises; and identifying a reference block based on the template matching.

Clause 6A. The method of any of clauses 1A-5A, wherein the method of decoding is performed as part of a method of encoding.

Clause 7A. A device for coding video data, the device comprising one or more means for performing the method of any of clauses 1A-6A.

Clause 8A. The device of clause 7A, wherein the one or more means comprise one or more processors implemented in circuitry.

Clause 9A. The device of clause 7A or 8A, further comprising a memory to store the video data.

Clause 10A. The device of any of clauses 7A-9A, further comprising a display configured to display decoded video data.

Clause 11A. The device of any of clauses 7A-10A, wherein the device comprises one or more of a camera, a computer, a mobile device, a broadcast receiver device, or a set-top box.

Clause 12A. The device of any of clauses 7A-11A, wherein the device comprises a video decoder.

Clause 13A. The device of any of clauses 7A-12A, wherein the device comprises a video encoder.

Clause 14A. A computer-readable storage medium having stored thereon instructions that, when executed, cause one or more processors to perform the method of any of clauses 1A-6A.

Clause 15A. A device for encoding video data, the device comprising: means for determining that a current block of the video data is encoded in an inter-prediction mode; and means for decoding the current block of the video data using the inter-prediction mode.

Clause 1B. A device for decoding video data, the device comprising: a memory configured to store video data; and one or more processors implemented in circuitry and configured to: determine that a current block of a current picture is encoded in an inter prediction mode; determine a motion vector for the current block based on the inter prediction mode; determine a motion vector precision for the motion vector; identify a current block template within the current picture; search within a search area for a final reference block template that corresponds to the current block template, wherein to search within the search area, the one or more processors are further configured to: identify an initial reference block template based on the motion vector, search other reference block templates around the initial reference block template using a step size that is set to an initial step size, and iteratively reduce the step size from the initial step size until the step size is set to a final step size that equals the motion vector precision; determine a prediction block for the current block based on the final reference block template; decode the current picture based on the determined prediction block; and output a decoded version of the current picture.

Clause 2B. The device of clause 1B, wherein to iteratively reduce the step size from the initial step size until the step size is set to the final step size that equals the motion vector precision, the one or more processors are further configured to: determine that the step size equals the motion vector precision; and in response to determining that the step size equals the motion vector precision, terminate the iteratively reducing of the step size.

Clause 3B. The device of clause 1B, wherein to iteratively reduce the initial step size until the final step size equals the motion vector precision, the one or more processors are further configured to: search the other reference block templates around the initial reference block template using the initial step size to determine a first refined motion vector; iteratively reduce the step size from the initial step size to a finer precision step size; identify a new initial reference block template based on the first refined motion vector; and search a second group of other reference block templates around the new initial reference block template using the finer precision step size to determine a second refined motion vector.

Clause 4B. The device of clause 1B, wherein the initial step size is equal to n-pel and to iteratively reduce the step size from the initial step size until the step size is set to the final step size that equals the motion vector precision, the one or more processors are further configured to reduce the step size from n-pel to n/2-pel.

Clause 5B. The device of clause 1B, wherein all values of the step size used for searching within the search area are greater than or equal to the motion vector precision.

Clause 6B. The device of clause 1B, wherein to iteratively reduce the step size, the one or more processors are further configured to reduce the step size by a factor of ½.

Clause 7B. The device of clause 1B, wherein to iteratively reduce the initial step size until the final step size equals the motion vector precision, the one or more processors are further configured to: search the other reference block templates around the initial reference block template using the initial step size and a first search pattern to determine a first refined motion vector; identify a new initial reference block template based on the first refined motion vector; and search a second group of other reference block templates around the new initial reference block template using the initial step size and a second search pattern to determine a second refined motion vector.

Clause 8B. The device of clause 1B, wherein the motion vector identifies a top-left sample of a reference block in a reference picture, and the search area is an area that is within 8 samples in an x-direction of the top-left sample and within 8 samples in a y-direction of the top-left sample.

Clause 9B. The device of clause 1B, wherein the motion vector precision and the final step size are greater than ⅛ pel.

Clause 10B. The device of clause 1B, wherein the inter prediction mode comprises an AMVP mode and determining the motion vector precision for the current block comprises receiving a syntax element in a bitstream indicating the motion vector precision.

Clause 11B. The device of clause 1B, wherein the inter prediction mode comprises a merge mode and determining the motion vector precision for the current block comprises determining the motion vector precision from a candidate in a merge list.

Clause 12B. The device of clause 1B, wherein to output the decoded version of the current picture, the one or more processors are further configured to output the decoded version of the current picture for display.

Clause 13B. The device of clause 1B, wherein the device for decoding is configured to decode the current block of the current picture as part of performing an encoding process for the current picture, and wherein to output the decoded version of the current picture, the one or more processors are further configured to store the decoded version of the current pictures for use in encoding subsequent blocks of the video data.

Clause 14B. The device of clause 1B, wherein the device comprises a wireless communication device, further comprising a receiver configured to receive encoded video data.

Clause 15B. The device of clause 14B, wherein the wireless communication device comprises a telephone handset and wherein the receiver is configured to demodulate, according to a wireless communication standard, a signal comprising the encoded video data.

Clause 16B. The device of clause 1B, further comprising: a display configured to display decoded video data.

Clause 17B. The device of clause 1B, wherein the device comprises one or more of a computer, a mobile device, a broadcast receiver device, or a set-top box.

Clause 18B. The device of clause 1B, wherein the device comprises a camera configured to capture the video data.

Clause 19B. A method of decoding video data, the method comprising: determining that a current block of a current picture is encoded in an inter prediction mode; determining a motion vector for the current block based on the inter prediction mode; determining a motion vector precision for the motion vector; identifying a current block template within the current picture; searching within a search area for a final reference block template that corresponds to the current block template, wherein searching within the search area comprises: identifying an initial reference block template based on the motion vector, searching other reference block templates around the initial reference block template using a step size that is set to an initial step size, and iteratively reducing the step size from the initial step size until the step size is set to a final step size that equals the motion vector precision; determining a prediction block for the current block based on the final reference block template; decoding the current picture based on the determined prediction block; and outputting a decoded version of the current picture.

Clause 20B. The method of clause 19B, wherein iteratively reducing the step size from the initial step size until the step size is set to the final step size that equals the motion vector precision comprises: determining that the step size equals the motion vector precision; and in response to determining that the step size equals the motion vector precision, terminating iteratively reducing the step size.

Clause 21B. The method of clause 19B, wherein iteratively reducing the initial step size until the final step size equals the motion vector precision comprises: searching the other reference block templates around the initial reference block template using the initial step size to determine a first refined motion vector; iteratively reducing the step size from the initial step size to a finer precision step size; identifying a new initial reference block template based on the first refined motion vector; and searching a second group of other reference block templates around the new initial reference block template using the finer precision step size to determine a second refined motion vector.

Clause 22B. The method of clause 19B, wherein the initial step size is equal to n-pel and iteratively reducing the step size from the initial step size until the step size is set to the final step size that equals the motion vector precision comprises reducing the step size from n-pel to n/2-pel.

Clause 23B. The method of clause 19B, wherein all values of the step size used for searching within the search area are greater than or equal to the motion vector precision.

Clause 24B. The method of clause 19B, wherein the iteratively reducing the step size comprises reducing the step size by a factor of ½.

Clause 25B. The method of clause 19B, wherein iteratively reducing the initial step size until the final step size equals the motion vector precision comprises: searching the other reference block templates around the initial reference block template using the initial step size and a first search pattern to determine a first refined motion vector; identifying a new initial reference block template based on the first refined motion vector; and searching a second group of other reference block templates around the new initial reference block template using the initial step size and a second search pattern to determine a second refined motion vector.

Clause 26B. The method of clause 19B, wherein the motion vector identifies a top-left sample of a reference block in a reference picture, and the search area is an area that is within 8 samples in an x-direction of the top-left samples and within 8 samples in a y-direction of the top-left sample.

Clause 27B. The method of clause 19B, wherein the motion vector precision and the final step size are greater than ⅛ pel.

Clause 28B. The method of clause 19B, wherein the inter prediction mode comprises an AMVP mode and determining the motion vector precision for the current block comprises receiving a syntax element in a bitstream indicating the motion vector precision.

Clause 29B. The method of clause 19B, wherein the inter prediction mode comprises a merge mode and determining the motion vector precision for the current block comprises determining the motion vector precision from a candidate in a merge list.

Clause 30B. The method of clause 19B, wherein outputting the decoded version of the current picture comprises outputting the decoded version of the current picture for display.

Clause 31B. The method of clause 19B, wherein the method of decoding is performed as part of a video encoding processing, and wherein outputting the decoded version of the current picture comprises storing the decoded version of the current pictures for use in encoding subsequent blocks of the video data.

Clause 32B. A computer-readable storage medium storing instructions that when executed by one or more processors cause the one or more processors to: determine that a current block of a current picture is encoded in an inter prediction mode; determine a motion vector for the current block based on the inter prediction mode; determine a motion vector precision for the motion vector; identify a current block template within the current picture; search within a search area for a final reference block template that corresponds to the current block template, wherein to search within the search area, the instructions cause the one or more processors to: identify an initial reference block template based on the motion vector, search other reference block templates around the initial reference block template using a step size that is set to an initial step size, and iteratively reduce the step size from the initial step size until the step size is set to a final step size that equals the motion vector precision; determine a prediction block for the current block based on the final reference block template; decode the current picture based on the determined prediction block; and output a decoded version of the current picture.

Clause 33B. The computer-readable storage medium of clause 32B, wherein to iteratively reduce the step size from the initial step size until the step size is set to the final step size that equals the motion vector precision, the one or more processors are further configured to: determine that the step size equals the motion vector precision; and in response to determining that the step size equals the motion vector precision, terminate the iteratively reducing of the step size.

Clause 34B. The computer-readable storage medium of clause 32B, wherein to iteratively reduce the initial step size until the final step size equals the motion vector precision, the one or more processors are further configured to: search the other reference block templates around the initial reference block template using the initial step size to determine a first refined motion vector; iteratively reduce the step size from the initial step size to a finer precision step size; identify a new initial reference block template based on the first refined motion vector; and search a second group of other reference block templates around the new initial reference block template using the finer precision step size to determine a second refined motion vector.

Clause 35B. The computer-readable storage medium of clause 32B, wherein the initial step size is equal to n-pel and to iteratively reduce the step size from the initial step size until the step size is set to the final step size that equals the motion vector precision, the one or more processors are further configured to reduce the step size from n-pel to n/2-pel.

Clause 36B. The computer-readable storage medium of clause 32B, wherein all values of the step size used for searching within the search area are greater than or equal to the motion vector precision.

Clause 37B. The computer-readable storage medium of clause 32B, wherein to iteratively reduce the step size, the one or more processors are further configured to reduce the step size by a factor of ½.

Clause 38B. The computer-readable storage medium of clause 32B, wherein to iteratively reduce the initial step size until the final step size equals the motion vector precision, the one or more processors are further configured to: search the other reference block templates around the initial reference block template using the initial step size and a first search pattern to determine a first refined motion vector; identify a new initial reference block template based on the first refined motion vector; and search a second group of other reference block templates around the new initial reference block template using the initial step size and a second search pattern to determine a second refined motion vector.

Clause 39B. The computer-readable storage medium of clause 32B, wherein the motion vector identifies a top-left sample of a reference block in a reference picture, and the search area is an area that is within 8 samples in an x-direction of the top-left samples and within 8 samples in a y-direction of the top-left sample.

Clause 40B. The computer-readable storage medium of clause 32B, wherein the motion vector precision and the final step size are greater than ⅛ pel.

Clause 41B. The computer-readable storage medium of clause 32B, wherein the inter prediction mode comprises an AMVP mode and determining the motion vector precision for the current block comprises receiving a syntax element in a bitstream indicating the motion vector precision.

Clause 42B. The computer-readable storage medium of clause 32B, wherein the inter prediction mode comprises a merge mode and determining the motion vector precision for the current block comprises determining the motion vector precision from a candidate in a merge list.

Clause 43B. The computer-readable storage medium of clause 32B, wherein to output the decoded version of the current picture, the one or more processors are further configured to output the decoded version of the current picture for display.

Clause 44B. The computer-readable storage medium of clause 32B, wherein the device for decoding is configured to decode the current block of the current picture as part of performing an encoding process for the current picture, and wherein to output the decoded version of the current picture, the one or more processors are further configured to store the decoded version of the current pictures for use in encoding subsequent blocks of the video data.

Clause 45B. A device for decoding video data, the device comprising: means for determining that a current block of a current picture is encoded in an inter prediction mode; means for determining a motion vector for the current block based on the inter prediction mode; means for determining a motion vector precision for the motion vector; means for identifying a current block template within the current picture; means for searching within a search area for a final reference block template that corresponds to the current block template, wherein the means for searching within the search area comprises: means for identifying an initial reference block template based on the motion vector, means for searching other reference block templates around the initial reference block template using a step size that is set to an initial step size, and means for iteratively reducing the step size from the initial step size until the step size is set to a final step size that equals the motion vector precision; means for determining a prediction block for the current block based on the final reference block template; means for decoding the current picture based on the determined prediction block; and means for outputting a decoded version of the current picture.

Clause 1C. A device for decoding video data, the device comprising: a memory configured to store video data; and one or more processors implemented in circuitry and configured to: determine that a current block of a current picture is encoded in an inter prediction mode; determine a motion vector for the current block based on the inter prediction mode; determine a motion vector precision for the motion vector; identify a current block template within the current picture; search within a search area for a final reference block template that corresponds to the current block template, wherein to search within the search area, the one or more processors are further configured to: identify an initial reference block template based on the motion vector, search other reference block templates around the initial reference block template using a step size that is set to an initial step size, and iteratively reduce the step size from the initial step size until the step size is set to a final step size that equals the motion vector precision; determine a prediction block for the current block based on the final reference block template; decode the current picture based on the determined prediction block; and output a decoded version of the current picture.

Clause 2C. The device of clause 1C, wherein to iteratively reduce the step size from the initial step size until the step size is set to the final step size that equals the motion vector precision, the one or more processors are further configured to: determine that the step size equals the motion vector precision; and in response to determining that the step size equals the motion vector precision, terminate the iteratively reducing of the step size.

Clause 3C. The device of any of clauses 1C-2C, wherein to iteratively reduce the initial step size until the final step size equals the motion vector precision, the one or more processors are further configured to: search the other reference block templates around the initial reference block template using the initial step size to determine a first refined motion vector; iteratively reduce the step size from the initial step size to a finer precision step size; identify a new initial reference block template based on the first refined motion vector; and search a second group of other reference block templates around the new initial reference block template using the finer precision step size to determine a second refined motion vector.

Clause 4C. The device of any of clauses 1C-3C, wherein the initial step size is equal to n-pel and to iteratively reduce the step size from the initial step size until the step size is set to the final step size that equals the motion vector precision, the one or more processors are further configured to reduce the step size from n-pel to n/2-pel.

Clause 5C. The device of any of clauses 1C-4C, wherein all values of the step size used for searching within the search area are greater than or equal to the motion vector precision.

Clause 6C. The device of any of clauses 1C-5C, wherein to iteratively reduce the step size, the one or more processors are further configured to reduce the step size by a factor of ½.

Clause 7C. The device of any of clauses 1C-6C, wherein to iteratively reduce the initial step size until the final step size equals the motion vector precision, the one or more processors are further configured to: search the other reference block templates around the initial reference block template using the initial step size and a first search pattern to determine a first refined motion vector; identify a new initial reference block template based on the first refined motion vector; and search a second group of other reference block templates around the new initial reference block template using the initial step size and a second search pattern to determine a second refined motion vector.

Clause 8C. The device of any of clauses 1C-7C, wherein the motion vector identifies a top-left sample of a reference block in a reference picture, and the search area is an area that is within 8 samples in an x-direction of the top-left samples and within 8 samples in a y-direction of the top-left sample.

Clause 9C. The device of any of clauses 1C-8C, wherein the motion vector precision and the final step size are greater than ⅛ pel.

Clause 10C. The device of any of clauses 1C-9C, wherein the inter prediction mode comprises an AMVP mode and determining the motion vector precision for the current block comprises receiving a syntax element in a bitstream indicating the motion vector precision.

Clause 11C. The device of any of clauses 1C-10C, wherein the inter prediction mode comprises a merge mode and determining the motion vector precision for the current block comprises determining the motion vector precision from a candidate in a merge list.

Clause 12C. The device of any of clauses 1C-11C, wherein to output the decoded version of the current picture, the one or more processors are further configured to output the decoded version of the current picture for display.

Clause 13C. The device of any of clauses 1C-12C, wherein the device for decoding is configured to decode the current block of the current picture as part of performing an encoding process for the current picture, and wherein to output the decoded version of the current picture, the one or more processors are further configured to store the decoded version of the current pictures for use in encoding subsequent blocks of the video data.

Clause 14C. The device of any of clauses 1C-13C, wherein the device comprises a wireless communication device, further comprising a receiver configured to receive encoded video data.

Clause 15C. The device of clause 14C, wherein the wireless communication device comprises a telephone handset and wherein the receiver is configured to demodulate, according to a wireless communication standard, a signal comprising the encoded video data.

Clause 16C. The device of any of clauses 1C-15C, further comprising: a display configured to display decoded video data.

Clause 17C. The device of any of clauses 1C-16C, wherein the device comprises one or more of a computer, a mobile device, a broadcast receiver device, or a set-top box.

Clause 18C. The device of any of clauses 1C-17C, wherein the device comprises a camera configured to capture the video data.

Clause 19C. A method of decoding video data, the method comprising: determining that a current block of a current picture is encoded in an inter prediction mode; determining a motion vector for the current block based on the inter prediction mode; determining a motion vector precision for the motion vector; identifying a current block template within the current picture; searching within a search area for a final reference block template that corresponds to the current block template, wherein searching within the search area comprises: identifying an initial reference block template based on the motion vector, searching other reference block templates around the initial reference block template using a step size that is set to an initial step size, and iteratively reducing the step size from the initial step size until the step size is set to a final step size that equals the motion vector precision; determining a prediction block for the current block based on the final reference block template; decoding the current picture based on the determined prediction block; and outputting a decoded version of the current picture.

Clause 20C. The method of clause 19C, wherein iteratively reducing the step size from the initial step size until the step size is set to the final step size that equals the motion vector precision comprises: determining that the step size equals the motion vector precision; and in response to determining that the step size equals the motion vector precision, terminating iteratively reducing the step size.

Clause 21C. The method of any of clauses 19C-20C, wherein iteratively reducing the initial step size until the final step size equals the motion vector precision comprises: searching the other reference block templates around the initial reference block template using the initial step size to determine a first refined motion vector; iteratively reducing the step size from the initial step size to a finer precision step size; identifying a new initial reference block template based on the first refined motion vector; and searching a second group of other reference block templates around the new initial reference block template using the finer precision step size to determine a second refined motion vector.

Clause 22C. The method of any of clauses 19C-21C, wherein the initial step size is equal to n-pel and iteratively reducing the step size from the initial step size until the step size is set to the final step size that equals the motion vector precision comprises reducing the step size from n-pel to n/2-pel.

Clause 23C. The method of any of clauses 19C-22C, wherein all values of the step size used for searching within the search area are greater than or equal to the motion vector precision.

Clause 24C. The method of any of clauses 19C-23C, wherein the iteratively reducing the step size comprises reducing the step size by a factor of ½.

Clause 25C. The method of any of clauses 19C-24C, wherein iteratively reducing the initial step size until the final step size equals the motion vector precision comprises: searching the other reference block templates around the initial reference block template using the initial step size and a first search pattern to determine a first refined motion vector; identifying a new initial reference block template based on the first refined motion vector; and searching a second group of other reference block templates around the new initial reference block template using the initial step size and a second search pattern to determine a second refined motion vector.

Clause 26C. The method of any of clauses 19C-25C, wherein the motion vector identifies a top-left sample of a reference block in a reference picture, and the search area is an area that is within 8 samples in an x-direction of the top-left samples and within 8 samples in a y-direction of the top-left sample.

Clause 27C. The method of any of clauses 19C-26C, wherein the motion vector precision and the final step size are greater than ⅛ pel.

Clause 28C. The method of any of clauses 19C-27C, wherein the inter prediction mode comprises an AMVP mode and determining the motion vector precision for the current block comprises receiving a syntax element in a bitstream indicating the motion vector precision.

Clause 29C. The method of any of clauses 19C-28C, wherein the inter prediction mode comprises a merge mode and determining the motion vector precision for the current block comprises determining the motion vector precision from a candidate in a merge list.

Clause 30C. The method of any of clauses 19C-29C, wherein outputting the decoded version of the current picture comprises outputting the decoded version of the current picture for display.

Clause 31C. The method of any of clauses 19C-30C, wherein the method of decoding is performed as part of a video encoding processing, and wherein outputting the decoded version of the current picture comprises storing the decoded version of the current pictures for use in encoding subsequent blocks of the video data.

Clause 32C. A computer-readable storage medium storing instructions that when executed by one or more processors cause the one or more processors to: determine that a current block of a current picture is encoded in an inter prediction mode; determine a motion vector for the current block based on the inter prediction mode; determine a motion vector precision for the motion vector; identify a current block template within the current picture; search within a search area for a final reference block template that corresponds to the current block template, wherein to search within the search area, the instructions cause the one or more processors to: identify an initial reference block template based on the motion vector, search other reference block templates around the initial reference block template using a step size that is set to an initial step size, and iteratively reduce the step size from the initial step size until the step size is set to a final step size that equals the motion vector precision; determine a prediction block for the current block based on the final reference block template; decode the current picture based on the determined prediction block; and output a decoded version of the current picture.

Clause 33C. The computer-readable storage medium of clause 32C, wherein to iteratively reduce the step size from the initial step size until the step size is set to the final step size that equals the motion vector precision, the one or more processors are further configured to: determine that the step size equals the motion vector precision; and in response to determining that the step size equals the motion vector precision, terminate the iteratively reducing of the step size.

Clause 34C. The computer-readable storage medium of any of clauses 32C-33C, wherein to iteratively reduce the initial step size until the final step size equals the motion vector precision, the one or more processors are further configured to: search the other reference block templates around the initial reference block template using the initial step size to determine a first refined motion vector; iteratively reduce the step size from the initial step size to a finer precision step size; identify a new initial reference block template based on the first refined motion vector; and search a second group of other reference block templates around the new initial reference block template using the finer precision step size to determine a second refined motion vector.

Clause 35C. The computer-readable storage medium of any of clauses 32C-34C, wherein the initial step size is equal to n-pel and to iteratively reduce the step size from the initial step size until the step size is set to the final step size that equals the motion vector precision, the one or more processors are further configured to reduce the step size from n-pel to n/2-pel.

Clause 36C. The computer-readable storage medium of any of clauses 32C-35C, wherein all values of the step size used for searching within the search area are greater than or equal to the motion vector precision.

Clause 37C. The computer-readable storage medium of any of clauses 32C-36C, wherein to iteratively reduce the step size, the one or more processors are further configured to reduce the step size by a factor of ½.

Clause 38C. The computer-readable storage medium of any of clauses 32C-37C, wherein to iteratively reduce the initial step size until the final step size equals the motion vector precision, the one or more processors are further configured to: search the other reference block templates around the initial reference block template using the initial step size and a first search pattern to determine a first refined motion vector; identify a new initial reference block template based on the first refined motion vector; and search a second group of other reference block templates around the new initial reference block template using the initial step size and a second search pattern to determine a second refined motion vector.

Clause 39C. The computer-readable storage medium of any of clauses 32C-38C, wherein the motion vector identifies a top-left sample of a reference block in a reference picture, and the search area is an area that is within 8 samples in an x-direction of the top-left samples and within 8 samples in a y-direction of the top-left sample.

Clause 40C. The computer-readable storage medium of any of clauses 32C-39C, wherein the motion vector precision and the final step size are greater than ⅛ pel.

Clause 41C. The computer-readable storage medium of any of clauses 32C-40C, wherein the inter prediction mode comprises an AMVP mode and determining the motion vector precision for the current block comprises receiving a syntax element in a bitstream indicating the motion vector precision.

Clause 42C. The computer-readable storage medium of any of clauses 32C-41C, wherein the inter prediction mode comprises a merge mode and determining the motion vector precision for the current block comprises determining the motion vector precision from a candidate in a merge list.

Clause 43C. The computer-readable storage medium of any of clauses 32C-42C, wherein to output the decoded version of the current picture, the one or more processors are further configured to output the decoded version of the current picture for display.

Clause 44C. The computer-readable storage medium of any of clauses 32C-43C, wherein the device for decoding is configured to decode the current block of the current picture as part of performing an encoding process for the current picture, and wherein to output the decoded version of the current picture, the one or more processors are further configured to store the decoded version of the current pictures for use in encoding subsequent blocks of the video data.

Clause 45C. A device for decoding video data, the device comprising: means for determining that a current block of a current picture is encoded in an inter prediction mode; means for determining a motion vector for the current block based on the inter prediction mode; means for determining a motion vector precision for the motion vector; means for identifying a current block template within the current picture; means for searching within a search area for a final reference block template that corresponds to the current block template, wherein the means for searching within the search area comprises: means for identifying an initial reference block template based on the motion vector, means for searching other reference block templates around the initial reference block template using a step size that is set to an initial step size, and means for iteratively reducing the step size from the initial step size until the step size is set to a final step size that equals the motion vector precision; means for determining a prediction block for the current block based on the final reference block template; means for decoding the current picture based on the determined prediction block; and means for outputting a decoded version of the current picture.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for decoding video data, the device comprising:
   a memory configured to store the video data;
   one or more processors implemented in circuitry and configured to:
   determine that a current block of a current picture is encoded in an inter prediction mode;
   determine a motion vector for the current block based on the inter prediction mode;
   determine a motion vector precision for the motion vector;
   identify a current block template within the current picture;
   search within a search area for a final reference block template that corresponds to the current block template, wherein to search within the search area, the one or more processors are further configured to:
   identify an initial reference block template based on the motion vector,
   search other reference block templates around the initial reference block template using a step size that is set to an initial step size, and
   iteratively reduce the step size from the initial step size until the step size is set to a final step size that equals the motion vector precision;
   determine a prediction block for the current block based on the final reference block template;
   decode the current picture based on the determined prediction block; and
   output a decoded version of the current picture.

2. The device of claim 1, wherein to iteratively reduce the step size from the initial step size until the step size is set to the final step size that equals the motion vector precision, the one or more processors are further configured to:
- determine that the step size equals the motion vector precision; and
- in response to determining that the step size equals the motion vector precision, terminate the iteratively reducing of the step size.

3. The device of claim 1, wherein to iteratively reduce the initial step size until the final step size equals the motion vector precision, the one or more processors are further configured to:
- search the other reference block templates around the initial reference block template using the initial step size to determine a first refined motion vector;
- iteratively reduce the step size from the initial step size to a finer precision step size;
- identify a new initial reference block template based on the first refined motion vector; and
- search a second group of other reference block templates around the new initial reference block template using the finer precision step size to determine a second refined motion vector.

4. The device of claim 1, wherein the initial step size is equal to n-pel and to iteratively reduce the step size from the initial step size until the step size is set to the final step size that equals the motion vector precision, the one or more processors are further configured to reduce the step size from n-pel to n/2-pel.

5. The device of claim 1, wherein all values of the step size used for searching within the search area are greater than or equal to the motion vector precision.

6. The device of claim 1, wherein to iteratively reduce the step size, the one or more processors are further configured to reduce the step size by a factor of ½.

7. The device of claim 1, wherein to iteratively reduce the initial step size until the final step size equals the motion vector precision, the one or more processors are further configured to:
- search the other reference block templates around the initial reference block template using the initial step size and a first search pattern to determine a first refined motion vector;
- identify a new initial reference block template based on the first refined motion vector; and
- search a second group of other reference block templates around the new initial reference block template using the initial step size and a second search pattern to determine a second refined motion vector.

8. The device of claim 1, wherein the motion vector identifies a top-left sample of a reference block in a reference picture, and the search area is an area that is within 8 samples in an x-direction of the top-left samples and within 8 samples in a y-direction of the top-left sample.

9. The device of claim 1, wherein the motion vector precision and the final step size are less than ⅛ pel.

10. The device of claim 1, wherein the inter prediction mode comprises an AMVP mode and determining the motion vector precision for the current block comprises receiving a syntax element in a bitstream indicating the motion vector precision.

11. The device of claim 1, wherein the inter prediction mode comprises a merge mode and determining the motion vector precision for the current block comprises determining the motion vector precision from a candidate in a merge list.

12. The device of claim 1, wherein to output the decoded version of the current picture, the one or more processors are further configured to output the decoded version of the current picture for display.

13. The device of claim 1, wherein the device for decoding is configured to decode the current block of the current picture as part of performing an encoding process for the current picture, and wherein to output the decoded version of the current picture, the one or more processors are further configured to store the decoded version of the current pictures for use in encoding subsequent blocks of the video data.

14. The device of claim 1, wherein the device comprises a wireless communication device, further comprising a receiver configured to receive encoded video data.

15. The device of claim 14, wherein the wireless communication device comprises a telephone handset and wherein the receiver is configured to demodulate, according to a wireless communication standard, a signal comprising the encoded video data.

16. The device of claim 1, further comprising a display configured to display decoded video data.

17. The device of claim 1, wherein the device comprises one or more of a computer, a mobile device, a broadcast receiver device, or a set-top box.

18. The device of claim 1, wherein the device comprises a camera configured to capture the video data.

19. A method of decoding video data, the method comprising:
- determining that a current block of a current picture is encoded in an inter prediction mode;
- determining a motion vector for the current block based on the inter prediction mode;
- determining a motion vector precision for the motion vector;
- identifying a current block template within the current picture;
- searching within a search area for a final reference block template that corresponds to the current block template, wherein searching within the search area comprises:
  - identifying an initial reference block template based on the motion vector,
  - searching other reference block templates around the initial reference block template using a step size that is set to an initial step size, and
  - iteratively reducing the step size from the initial step size until the step size is set to a final step size that equals the motion vector precision;
- determining a prediction block for the current block based on the final reference block template;
- decoding the current picture based on the determined prediction block; and
- outputting a decoded version of the current picture.

20. The method of claim 19, wherein iteratively reducing the step size from the initial step size until the step size is set to the final step size that equals the motion vector precision comprises:
- determining that the step size equals the motion vector precision; and
- in response to determining that the step size equals the motion vector precision, terminating iteratively reducing the step size.

21. The method of claim 19, wherein iteratively reducing the initial step size until the final step size equals the motion vector precision comprises:

searching the other reference block templates around the initial reference block template using the initial step size to determine a first refined motion vector;
iteratively reducing the step size from the initial step size to a finer precision step size;
identifying a new initial reference block template based on the first refined motion vector; and
searching a second group of other reference block templates around the new initial reference block template using the finer precision step size to determine a second refined motion vector.

22. The method of claim 19, wherein the initial step size is equal to n-pel and iteratively reducing the step size from the initial step size until the step size is set to the final step size that equals the motion vector precision comprises reducing the step size from n-pel to n/2-pel.

23. The method of claim 19, wherein all values of the step size used for searching within the search area are greater than or equal to the motion vector precision.

24. The method of claim 19, wherein the iteratively reducing the step size comprises reducing the step size by a factor of ½.

25. The method of claim 19, wherein iteratively reducing the initial step size until the final step size equals the motion vector precision comprises:
searching the other reference block templates around the initial reference block template using the initial step size and a first search pattern to determine a first refined motion vector;
identifying a new initial reference block template based on the first refined motion vector; and
searching a second group of other reference block templates around the new initial reference block template using the initial step size and a second search pattern to determine a second refined motion vector.

26. The method of claim 19, wherein the motion vector identifies a top-left sample of a reference block in a reference picture, and the search area is an area that is within 8 samples in an x-direction of the top-left samples and within 8 samples in a y-direction of the top-left sample.

27. The method of claim 19, wherein the motion vector precision and the final step size are less than ⅛ pel.

28. The method of claim 19, wherein the inter prediction mode comprises an AMVP mode and determining the motion vector precision for the current block comprises receiving a syntax element in a bitstream indicating the motion vector precision.

29. The method of claim 19, wherein the inter prediction mode comprises a merge mode and determining the motion vector precision for the current block comprises determining the motion vector precision from a candidate in a merge list.

30. The method of claim 19, wherein outputting the decoded version of the current picture comprises outputting the decoded version of the current picture for display.

31. The method of claim 19, wherein the method of decoding is performed as part of a video encoding processing, and wherein outputting the decoded version of the current picture comprises storing the decoded version of the current pictures for use in encoding subsequent blocks of the video data.

32. A computer-readable storage medium storing instructions that when executed by one or more processors cause the one or more processors to:
determine that a current block of a current picture is encoded in an inter prediction mode;
determine a motion vector for the current block based on the inter prediction mode;
determine a motion vector precision for the motion vector;
identify a current block template within the current picture;
search within a search area for a final reference block template that corresponds to the current block template, wherein to search within the search area, the instructions cause the one or more processors to:
identify an initial reference block template based on the motion vector,
search other reference block templates around the initial reference block template using a step size that is set to an initial step size, and
iteratively reduce the step size from the initial step size until the step size is set to a final step size that equals the motion vector precision;
determine a prediction block for the current block based on the final reference block template;
decode the current picture based on the determined prediction block; and
output a decoded version of the current picture.

33. The computer-readable storage medium of claim 32, wherein to iteratively reduce the step size from the initial step size until the step size is set to the final step size that equals the motion vector precision, the one or more processors are further configured to:
determine that the step size equals the motion vector precision; and
in response to determining that the step size equals the motion vector precision, terminate the iteratively reducing of the step size.

34. The computer-readable storage medium of claim 32, wherein to iteratively reduce the initial step size until the final step size equals the motion vector precision, the one or more processors are further configured to:
search the other reference block templates around the initial reference block template using the initial step size to determine a first refined motion vector;
iteratively reduce the step size from the initial step size to a finer precision step size;
identify a new initial reference block template based on the first refined motion vector; and
search a second group of other reference block templates around the new initial reference block template using the finer precision step size to determine a second refined motion vector.

35. The computer-readable storage medium of claim 32, wherein the initial step size is equal to n-pel and to iteratively reduce the step size from the initial step size until the step size is set to the final step size that equals the motion vector precision, the one or more processors are further configured to reduce the step size from n-pel to n/2-pel.

36. The computer-readable storage medium of claim 32, wherein all values of the step size used for searching within the search area are greater than or equal to the motion vector precision.

37. The computer-readable storage medium of claim 32, wherein to iteratively reduce the step size, the one or more processors are further configured to reduce the step size by a factor of ½.

38. The computer-readable storage medium of claim 32, wherein to iteratively reduce the initial step size until the final step size equals the motion vector precision, the one or more processors are further configured to:

search the other reference block templates around the initial reference block template using the initial step size and a first search pattern to determine a first refined motion vector;

identify a new initial reference block template based on the first refined motion vector; and search a second group of other reference block templates around the new initial reference block template using the initial step size and a second search pattern to determine a second refined motion vector.

39. The computer-readable storage medium of claim 32, wherein the motion vector identifies a top-left sample of a reference block in a reference picture, and the search area is an area that is within 8 samples in an x-direction of the top-left samples and within 8 samples in a y-direction of the top-left sample.

40. The computer-readable storage medium of claim 32, wherein the motion vector precision and the final step size are less than ⅛ pel.

41. The computer-readable storage medium of claim 32, wherein the inter prediction mode comprises an AMVP mode and determining the motion vector precision for the current block comprises receiving a syntax element in a bitstream indicating the motion vector precision.

42. The computer-readable storage medium of claim 32, wherein the inter prediction mode comprises a merge mode and determining the motion vector precision for the current block comprises determining the motion vector precision from a candidate in a merge list.

43. The computer-readable storage medium of claim 32, wherein to output the decoded version of the current picture, the one or more processors are further configured to output the decoded version of the current picture for display.

44. The computer-readable storage medium of claim 32, wherein the device for decoding is configured to decode the current block of the current picture as part of performing an encoding process for the current picture, and wherein to output the decoded version of the current picture, the one or more processors are further configured to store the decoded version of the current pictures for use in encoding subsequent blocks of the video data.

45. A device for decoding video data, the device comprising:

means for determining that a current block of a current picture is encoded in an inter prediction mode;

means for determining a motion vector for the current block based on the inter prediction mode;

means for determining a motion vector precision for the motion vector;

means for identifying a current block template within the current picture;

means for searching within a search area for a final reference block template that corresponds to the current block template, wherein the means for searching within the search area comprises:

means for identifying an initial reference block template based on the motion vector, means for searching other reference block templates around the initial reference block template using a step size that is set to an initial step size, and means for iteratively reducing the step size from the initial step size until the step size is set to a final step size that equals the motion vector precision;

means for determining a prediction block for the current block based on the final reference block template;

means for decoding the current picture based on the determined prediction block; and means for outputting a decoded version of the current picture.

\* \* \* \* \*